United States Patent
Esaki et al.

(10) Patent No.: US 7,569,619 B2
(45) Date of Patent: Aug. 4, 2009

(54) RADIATION-CURABLE RESIN COMPOSITION AND CURED PRODUCT THEREOF

(75) Inventors: Akira Esaki, Kanagawa (JP); Osamu Matsuda, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/123,041

(22) Filed: May 6, 2005

(65) Prior Publication Data

US 2005/0267230 A1  Dec. 1, 2005

Related U.S. Application Data

(63) Continuation of application No. PCT/JP03/14193, filed on Nov. 7, 2003.

(30) Foreign Application Priority Data

Nov. 8, 2002 (JP) .............................. 2002-325706
Jun. 24, 2003 (JP) .............................. 2003-179251

(51) Int. Cl.
  *C09D 1/00* (2006.01)
  *C09D 183/00* (2006.01)
(52) U.S. Cl. .............................. 522/79; 522/80; 522/83; 522/84; 522/172; 524/847
(58) Field of Classification Search ............ 522/25, 522/79, 80, 83, 172; 524/858, 847
See application file for complete search history.

(56) References Cited

U.S. PATENT DOCUMENTS

| | | | | |
|---|---|---|---|---|
| 4,348,462 A | * | 9/1982 | Chung | ....................... 428/412 |
| 4,455,205 A | * | 6/1984 | Olson et al. | .................... 522/44 |
| 4,842,837 A | * | 6/1989 | Shimizu et al. | .............. 423/335 |
| 5,209,998 A | * | 5/1993 | Kavassalis et al. | ........ 430/108.7 |
| 5,318,850 A | | 6/1994 | Pickett et al. | |
| 5,466,491 A | | 11/1995 | Factor et al. | |
| 5,728,505 A | | 3/1998 | Dueber et al. | |
| 6,083,314 A | * | 7/2000 | Nakashima et al. | .... 106/287.16 |
| 6,160,067 A | * | 12/2000 | Eriyama et al. | .............. 526/279 |
| 2006/0093786 A1 | * | 5/2006 | Ohashi et al. | ................ 428/131 |

FOREIGN PATENT DOCUMENTS

| | | |
|---|---|---|
| EP | 0 599 075 A1 | 6/1994 |
| EP | 0 603 779 A1 | 6/1994 |
| EP | 0 628 956 A1 | 12/1994 |
| EP | 0 824 119 A2 | 2/1998 |
| EP | 1 167 313 A1 * | 1/2002 |

(Continued)

OTHER PUBLICATIONS

JP 05-302041 A, Abstract and Machine Translation of Detailed Description from JPO-PAG website, Nov. 16, 1993.*
JP 10-298265 A, Abstract and Machine Translation of Detailed Description from JPO-PAG website, Oct. 11, 1998.*
JP 2002-038028 A, Abstract and Macheine Translation of Detailed Description from JPO-PAG website, Feb. 6, 2002.*

*Primary Examiner*—Susan W Berman
(74) *Attorney, Agent, or Firm*—Oblon, Spivak, McClelland, Maier & Neustadt, P.C.

(57) ABSTRACT

A radiation-curable resin composition comprising an inorganic component containing a silica particle composed of a hydrolyzate of an oligomer of an alkoxysilane and a monomer and/or an oligomer thereof, wherein viscosity at 25° C. is from 1,000 to 10,000 centipoises.

30 Claims, 1 Drawing Sheet

FOREIGN PATENT DOCUMENTS

| | | |
|---|---|---|
| JP | 62-204252 | 9/1987 |
| JP | 62-256874 | 11/1987 |
| JP | 64-20220 | 1/1989 |
| JP | 4-236266 | 8/1992 |
| JP | 5-179157 | 7/1993 |
| JP | 5-202314 | 8/1993 |
| JP | 5-302041 | 11/1993 |
| JP | 7-252333 | 10/1995 |
| JP | 9-110984 | 4/1997 |
| JP | 9-255873 | 9/1997 |
| JP | 10-95937 | 4/1998 |
| JP | 10-218967 | 8/1998 |
| JP | 10-231339 | 9/1998 |
| JP | 10-298252 | 11/1998 |
| JP | 10-298253 | 11/1998 |
| JP | 10-298254 | 11/1998 |
| JP | 10-298265 | 11/1998 |
| JP | 10-330409 | 12/1998 |
| JP | 11-35657 | 2/1999 |
| JP | 2000-289172 | 10/2000 |
| JP | 2001-64346 | 3/2001 |
| JP | 2001-113649 | 4/2001 |
| JP | 2001-206922 | 7/2001 |
| JP | 2002-12652 | 1/2002 |
| JP | 2002-38028 | 2/2002 |
| JP | 2002-69333 | 3/2002 |
| JP | 2002-229201 | 8/2002 |
| JP | 2002-245672 | 8/2002 |
| JP | 2003-82043 | 3/2003 |
| JP | 2003-140147 | 5/2003 |
| WO | WO 95/17349 | 6/1995 |
| WO | WO 99/31190 | 6/1999 |
| WO | WO 01/26107 A2 | 4/2001 |
| WO | WO 02/23273 A2 | 3/2002 |
| WO | WO 02/24824 | 3/2002 |

* cited by examiner

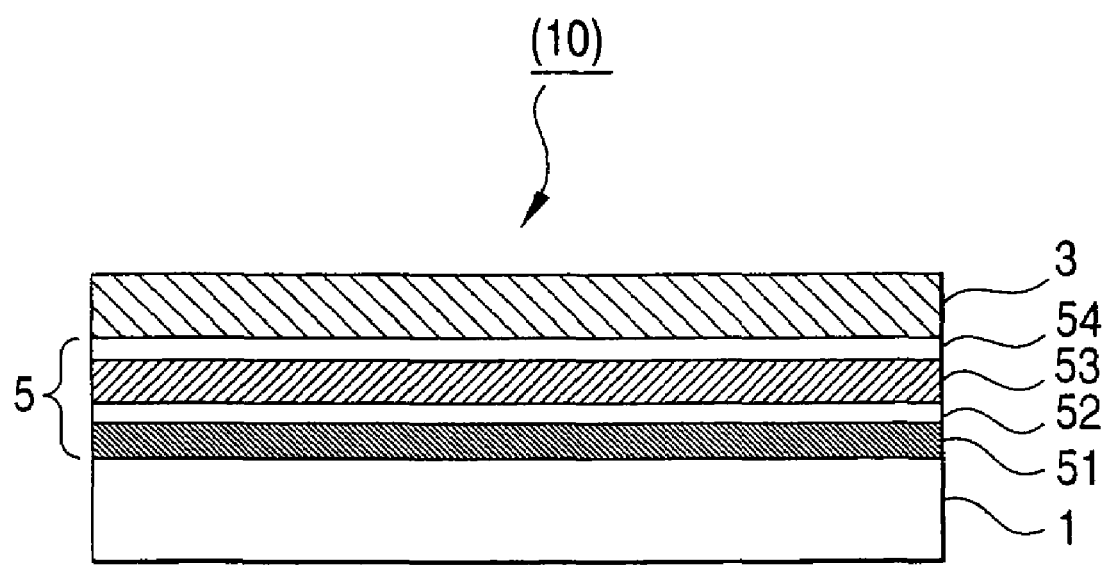

RADIATION-CURABLE RESIN COMPOSITION AND CURED PRODUCT THEREOF

FIELD OF THE INVENTION

The present invention relates to a radiation-curable resin composition and a process for producing the same, and a cured product thereof. More specifically, it relates to a cured resin product having excellent optical properties, surface curability, and adhesion, as well as a curable composition affording the same by a curing reaction and a process for producing the same.

BACKGROUND ART

Curable resin compositions have been widely used as various coating materials and adhering materials or in optical applications. For example, specific examples of the optical applications of curable resin compositions include protective films of information recording layers in optical information recording media, particularly optical recording media. In particular, there have been conducted investigations on next-generation high-density optical disks using a blue laser (cf. Patent Document 1).

In Patent Document 1, a urethane (meth)acrylate is used as a protective layer but since the protective film is formed as a thicker film as compared with conventional ones, hardness is insufficient only with the protective layer. Therefore, by laminating a cured product of colloidal silica fine particles and an ethylenically unsaturated compound thereon as a hard coat layer, strength and shrinkage at curing are balanced. However, such a laminate type protective film is still practically insufficient in view of cost, operability, and the like.

On the other hand, Patent Document 2 is known as a polyurethane-based organic-inorganic hybrid composition to be used for coating. However, such a composition having no radiation-curable group requires a long time of 3 days for curing and thus is not practical.

Patent Document 1: JP-A-2002-245672
Patent Document 2: JP-A-2001-64346

As mentioned above, since strength when formed as a thick film is insufficient in the radiation-curable resin compositions having transparency used as protective films for information recording media hitherto known, it is desired to develop a curable resin composition having transparency and a high adhesion as the conventional protective films have and also having a sufficient strength and a low shrinkage at curing even when formed as a thick film.

DISCLOSURE OF THE INVENTION

As a result of the extensive studies for solving the above problems, the present inventors have found that the above problem is solved by a radiation-curable resin composition containing an inorganic component containing a silica particle and a monomer and/or an oligomer thereof, the composition having particular physical properties and a particular composition.

Namely, the gist of the invention lies in the following: a radiation-curable resin composition comprising an inorganic component containing a silica particle composed of a hydrolyzate of an oligomer of an alkoxysilane and a monomer and/or an oligomer thereof, wherein a viscosity at 25° C. is from 1,000 to 10,000 centipoises; a radiation-curable resin composition comprising a silica particle composed of a hydrolyzate of an oligomer of an alkoxysilane, a monomer containing a urethane bond or a hydroxyalkylene group and/or an oligomer thereof, and a silane coupling agent; and a radiation-curable resin composition comprising a silica particle and a monomer containing a urethane bond or a hydroxyalkylene group and/or an oligomer thereof, wherein the monomer and/or the oligomer thereof further have an acid group; as well as a cured product thereof and a laminate and an optical recording medium having a layer composed of the cured-product.

According to the invention, there is provided a curable resin composition having transparency and a high adhesion as the conventional protective films have and also having a sufficient strength and a low shrinkage at curing even when formed as a thick film.

BRIEF DESCRIPTION OF THE DRAWINGS

FIG. 1 is a schematic view illustrating cross-section of an optical recording medium which is an example of the invention.

With regard to the numerals in the FIGURE, 1 represents a substrate, 3 represents a protective layer, 5 represents a record-retrieving function layer, 51 represents a reflecting layer, 52 and 54 each represents a dielectric layer, 53 represents a recording layer, and 10 represents an optical recording medium.

BEST MODE FOR CARRYING OUT THE INVENTION

As a result of the extensive studies for solving the above problems, the present inventors have found that, when a radiation-curable resin composition containing a silica ultrafine particle synthesized by a particular synthetic method and a monomer and/or an oligomer thereof, viscosity of the composition being a particular value, is cured as a thick film, the cured product obtained has a high transparency, a high hardness, and a low shrinkage.

Moreover, they have found that a radiation-curable resin composition having a very good dispersibility is obtained by mixing silica particles by a particular synthetic method with a monomer containing a urethane bond or a hydroxyalkylene group and/or an oligomer thereof in the presence of a silane coupling agent having a hydrophilic functional group and a hydrophobic functional group. Silica particles are usually hydrophilic, but by making the surface hydrophobic with silane coupling, the dispersibility in the monomer and/or the oligomer thereof which are usually hydrophobic is remarkably enhanced.

Furthermore, they have found that a radiation-curable resin composition having a good adhesion durability to an adherent material is obtained by mixing silica particles by a particular synthetic method with a monomer containing a urethane bond or a hydroxyalkylene group and/or an oligomer thereof.

Therefore, according to the invention, there is an advantage that a radiation-curable resin composition is obtained, which does not aggregate even when a large amount of silica particles are dispersed.

Additionally, they have found that an extremely highly dispersed transparent cured product having excellent optical properties without occurrence of secondary aggregation of ultrafine particles is obtained by radiation-curing the radiation-curable resin composition within a short period through irradiation thereof with an active energy ray. Thereby, since a large amount of silica ultrafine particles can be contained, there is an advantage that a transparent cured product excellent in dimensional stability, hardness properties, and the like derived from silica is obtained. Furthermore, according to the invention, since a radiation-curable resin composition having an urethane bond or a hydroxyalkylene group is used, there is an advantage that the cured product obtained has a high transparency, a high adhesion, a high degree of surface curing, and a hard surface hardness. Moreover, the present cured product is basically colorless, it can be variously colored depending on applications.

Furthermore, the inventors have also found an excellent process for producing such radiation-curable resin compositions. Namely, the process includes a series of steps comprising first protecting the surface of silica ultrafine particles synthesized by a particular synthetic method in a liquid medium such as an alcohol-based one or a ketone-based one with a silane coupling agent or the like, then mixing the particles with a monomer and/or an oligomer thereof, and removing the solvent under appropriate conditions. Thereby, a radiation-curable resin composition having a very good dispersibility is obtained even when a large amount of silica is contained.

The following will explain modes for carrying out the invention in detail.

(Inorganic Composition)

The radiation-curable resin composition of the invention contains an inorganic component and a monomer and/or an oligomer thereof.

The inorganic component contains silica particles. In the invention, silica means generic silicon oxides regardless of the ratio of silicon to oxygen and crystal or amorphous. As the silica particle, in addition to silica particle industrially commercially available and in a state dispersed in a solvent, a powdery silica particle, and the like, a silica particle derived and synthesized from starting materials such as alkoxysilanes may be mentioned but, in view of easy mixing and dispersion as a radiation-curable resin composition, more preferred are silica particles in a state dispersed in a solvent or silica particles derived and synthesized from starting materials such as alkoxysilanes.

In the invention, the silica particle is preferably ultrafine particle and the lower limit value of a number-average particle size is preferably 0.5 nm or more, more preferably 1 nm or more. When the number-average particle size is too small, aggregating property of the ultrafine particles extremely increases and hence transparency and mechanical strength of the cured product extremely lower or properties due to a quantum effect become not remarkable in some cases. Moreover, the upper limit value is preferably 50 nm or less, more preferably 40 nm or less, further preferably less than 30 nm, particularly preferably less than 15 nm, most preferably less than 12 nm.

In addition, the silica particle, preferably a silica particle having a particle size of 30 nm or larger, more preferably a silica particle having a particle size of 15 nm or larger are in an amount of preferably 1% by weight or less, further preferably 0.5% by weight or less relative to the radiation-curable resin composition. Alternatively, the particles are preferably 1% by volume or less, further preferably 0.5% by volume or less relative to the cured product. When they are contained in a large amount, light scattering increases and hence transmittance decreases, so that the case is not preferred.

For the determination of the above number-average particle size, a numeral measured from an observed image on a transmission electron microscope (TEM). Namely, the diameter of a circle having the same area as the observed ultrafine particle image is defined as the particle size of the particle image. Using the particle size thus determined, the number-average particle size is calculated, for example, by a known statistical processing method of image data and the number of ultrafine particle images to be used for such a statistical processing is desirably as many as possible. For example, in view of reproducibility, the number of the particle images randomly selected is at least 50 or more, preferably 80 or more, further preferably 100 or more. The calculation of a volume percentage in the cured product is converted by the volume of a sphere having the particle size determined as above as a diameter.

As the silica particles in a state dispersed in a solvent, a dispersion having solid mass of 10 to 40% by weight can be used. Specific examples of the dispersing medium include alcohols such as methyl alcohol, isopropyl alcohol, n-butyl alcohol, and isobutyl alcohol; glycols such as ethylene glycol; esters such as ethyl cellosolve; amides such as dimethylacetamide; hydrocarbons such as xylene; ethers; and mixtures thereof. Of these, preferred are isopropyl alcohol, n-butyl alcohol, isobutyl alcohol, ethyl cellosolve, and mixtures thereof in view of a good compatibility to organic components and transparency of the resulting cured product.

Moreover, as the silica particles, it is possible to use those subjected to surface treatment with a surface treating agent such as a surfactant or a silane coupling agent. By using a surface treating agent, growth to coarse aggregates or particles can be prevented and thus a highly dispersed and transparent radiation-curable resin composition can be obtained.

Preferred as the silica particles are silica particles composed of a hydrolyzate of an oligomer of an alkoxysilane. Since conventional usual silica particles have a broad particle size distribution and usually contain particles having a large particle size, e.g., 50 nm or larger, transparency becomes unsatisfactory in many cases and there is a problem that the particles tend to precipitate. Those from which particles having a large particle size are separated (so-called cut product) are also known, but they tend to secondarily aggregate easily and thus transparency is impaired in most cases. By a particular synthetic method of hydrolysis of an oligomer of an alkoxysilane, silica particles having an extremely small particle size are stably obtained and there is an advantage that a high transparency can be obtained since the silica particles have a difficultly aggregating property.

The hydrolyzate herein refers to a product obtained by reactions including at least hydrolysis and the reactions may be accompanied by dehydrative condensation. Moreover, the hydrolysis also includes dealcoholation.

An alkoxysilanes is a compound wherein alkoxy groups are bonded to a silicon atom and the compound forms an alkoxysilane oligomer through hydrolysis and dehydrative condensation (or dealcoholative condensation). In order that the alkoxysilane oligomer has compatibility to water or a solvent as mentioned below, the alkyl chain of the alkoxysilane to be used in the invention is preferably not so long, and has usually about 1 to 5 carbon atoms, preferably about 1 to 3 carbon atoms. Specific examples include tetramethoxysilane, tetraethoxysilane, and the like.

As a starting material of silica particles composed of a hydrolyzate of an alkoxysilane, an alkoxysilane oligomer is used as a starting material. The reasons why an alkoxysilane monomer is not used as the starting material are that a transparent composition becomes difficult to obtain since there are tendencies that the control of the particle size is difficult, the distribution of the particle size is apt to be broad and the particle size is difficult to be uniform, and the like, as well as the use is not preferred in view of safety and hygienic grounds since some kinds o monomers have toxicity. The oligomer can be produced by known processes such as the process described in JP-A-7-48454.

The alkoxysilane oligomer is hydrolyzed by adding a certain amount of water to the alkoxysilane oligomer in a particular solvent and treating it with a catalyst. By the hydrolysis, silica ultrafine particles can be obtained.

As the solvent, one or two or more solvents among alcohols, glycols, hydrocarbons, esters, ketones, ethers, and the like can be used singly or in combination. Of these, alcohols and ketones are particularly preferred.

Specific examples of the alcohols include methanol, ethanol, isopropyl alcohol, n-butyl alcohol, isobutyl alcohol, octanol, n-propyl alcohol, acetylacetone alcohol, and the like. Specific examples of the ketones include acetone, methyl ethyl ketone, methyl isobutyl ketone, and the like.

In order to stabilize the silica particles which are hydrophilic, the alkyl chains of the alcohols or ketones are preferably short. Particularly preferred are methanol, ethanol, and acetone. Of these, acetone has a low boiling point and an advantage that the time required for the step of removing the solvent is relatively short.

The amount of water required for the hydrolysis of the alkoxysilane oligomer is usually 0.05 equivalent or more, more preferably 0.3 equivalent or more to the mol number of the alkoxy groups contained in the alkoxysilane oligomer. When the amount of water is too small, the silica particles do not grow to a sufficient size and hence expected properties cannot be exhibited, so that the case is not preferred. However, the upper limit value is usually 1 equivalent or less. To the contrary, when the amount is too large, the alkoxysilane oligomer tends to form gel, so that the case is not preferred.

The alkoxysilane oligomer of the invention preferably has compatibility to the above solvents and water.

As the catalyst to be used in the hydrolysis, one or two or more catalysts among metal chelate compounds, organic acids, metal alkoxides, boron compounds, and the like can be used singly or in combination. Particularly, metal chelate compounds and organic acids are preferred.

Specific examples of the metal chelate compounds include aluminum tris(acetylacetonate), titanium tetrakis(acetylacetonate), titanium bis(isopropoxy)bis(acetylacetonate), zirconium tetrakis(acetylacetonate), zirconium bis(butoxy)bis(acetylacetonate), zirconium bis(isopropoxy)bis(acetylacetonate), and the like. Of these, one or two or more compounds can be used singly or in combination and particularly, aluminum tris(acetylacetonate) is preferably used.

Moreover, specific examples of the organic acids include formic acid, acetic acid, propionic acid, maleic acid, and the like. Of these, one or two or more acids can be used singly or in combination. Particularly, maleic acid is preferably used. In the case of using maleic acid, the hue of the cured product obtained by radiation-curing is satisfactory and there is an advantage that yellowish coloring tends to be little, so that the case is not preferred.

The amount of these catalyst components to be added is not particularly limited as far as the amount is in the range where the action is sufficiently exhibited. Usually, the amount is preferably 0.1 part by weight or more, more preferably 0.5 part by weight or more relative to 100 parts by weight of the alkoxysilane oligomer. However, since the action does not vary even when the amount is so much, the amount is usually 10 parts by weight or less, more preferably 5 parts by weight or less.

In the invention, by using silica particles composed of a hydrolyzate of an alkoxysilane oligomer, there is an advantage that ultrafine particles having an extremely uniform particle size can be added to a radiation-curable resin composition or a radiation-cured product as compared with the silica particles hitherto commonly used as a filler component. Moreover, since the present silica particles also have a difficultly aggregating property, there is an advantage that they can be homogeneously dispersed in a radiation-curable resin composition or a radiation-cured product. Thereby, a radiation-transmitting property is not impaired even when a large amount of silica particles are added, silica particles can be added in a sufficient amount for enhancing dimensional stability and mechanical properties. Furthermore, by combining the silica particles obtained by such a particular process and surface protection of silica particles, such as a silane coupling agent to be mentioned below, and by adding a monomer and/or an oligomer thereof thereto, there is an advantage that a larger amount of silica particles can be dispersed without aggregation.

Accordingly, there is an advantage that the radiation-cured product obtained according to the invention has an excellent properties including transparency and also dimensional stability, mechanical strength, adhesion, and the like.

In the invention, other inorganic components may be incorporated in addition to the silica particles composed of a hydrolyzate of an oligomer of an alkoxysilane. The other inorganic components are not particularly limited and, for example, a colorless metal or a colorless metal oxide may be used. Specific examples include silver, palladium, alumina, zirconia, aluminum hydroxide, titanium oxide, zinc oxide, calcium carbonate, clay mineral powders, and the like. Preferred is alumina, zinc oxide, or titanium oxide.

A process for producing the other inorganic components is not particularly limited but preferred are processes of pulverizing a commercially available product by a pulverizer such as a ball mil; of production by a sol-gel process; and the like, since they can reduce the particle size. Further preferred is a production by a sol-gel process.

In the invention, the inorganic component is preferably in the form of ultrafine particles. The lower limit value of the number-average particle size is preferably 0.5 nm or more, more preferably 1 nm or more. When the number-average particle size is too small, aggregating property of the ultrafine particles extremely increases and hence transparency and mechanical strength of the cured product extremely lower or properties due to a quantum effect become not remarkable in some cases. Moreover, the upper limit value is preferably 50 nm or less, more preferably 40 nm or less, further preferably less than 30 nm, particularly preferably less than 15 nm, most preferably less than 12 nm.

In addition, the inorganic components, preferably inorganic components having a particle size of 30 nm or larger, more preferably inorganic components having a particle size of 15 nm or larger are in an amount of preferably 1% by weight or less, further preferably 0.5% by weight or less relative to the radiation-curable resin composition. Alternatively, the components are preferably 1% by volume or less, further preferably 0.5% by volume or less relative to the cured product. When they are contained in a large amount, light scattering increases and hence transmission decreases, so that the case is not preferable. As the method for determining the number-average particle size, the same method as mentioned above may be mentioned.

The content of the inorganic components in the radiation-curable resin composition of the invention is preferably as large as possible to contain in order to enhance dimensional stability and hardness properties, and is preferably 5% by weight or more, more preferably 10% by weight or more relative to the radiation-curable resin composition. Alternatively, the content is preferably 2% by volume or more, more preferably 5% by volume or more.

However, in order to maintain high transparency and mechanical strength of the cured product, it is preferred that the content is not too large, and the content is preferably 60% by weight or less, further preferably 40% by weight or less, more preferably 30% by weight or less relative to the radiation-curable resin composition. Alternatively, the content is preferably 30% by volume or less, more preferably 20% by volume or less, further preferably 15% by volume or less relative to the radiation-cured product.

Of these, the content of the silica particles in the inorganic components is usually 50& by weight or more, preferably 60% by weight or more, more preferably 70% by weight or more. The upper limit is 100% by weight or less.

(Surface Treatment)

The inorganic components of the invention can be protected by surface treatment of the particle surface, if necessary.

Usually, the above inorganic components, particularly the silica particles formed as mentioned above have strong polarity and they have compatibility to water and alcohols and do not have compatibility to a monomer and/or an oligomer thereof in many cases. Therefore, there is a possibility that aggregation or white turbidity may occur at the time when the monomer and/or the oligomer thereof are added.

Thus, by making the surface of the inorganic components hydrophobic through the addition of a surface treating agent having a hydrophilic group and a hydrophobic group, compatibility to the monomer and/or the oligomer thereof is imparted to prevent aggregation and white turbidity.

As the method for surface treatment, the addition of a dispersant or a surfactant or a method of modifying the surface with a coupling agent are preferably employed.

The dispersant may be also selected from polymer dispersants used in fine particle dispersions such as various inks, paints, and toners for electrophotography and used. Such a polymer dispersant may be suitably selected from acrylic polymer dispersants, urethane-based polymer dispersants, and the like. Specific examples include, as trade names, EFKA (manufactured by Efka Additives), Disperbyk (manufactured by BYK), Disperon (manufactured by Kusumoto Chemicals, Ltd.), and the like. The amount of the dispersant to be used is preferably from 10 to 500% by weight, more preferably from 20 to 300% by weight relative to the inorganic components.

Moreover, the surfactant to be used is not particularly limited and can be selected from cationic, anionic, nonionic, or amphoteric polymers or low molecular weight various non-aqueous surfactants. Specifically, there may be mentioned sulfonamide-based ones ("Solspers 3000" manufactured by Avecia Pigments & Additives), hydrostearic acid-based ones ("Solspers 17000" manufactured by Avecia Pigments & Additives), fatty acid amine-based ones, ε-caprolactone-based ones ("Solspers 24000" manufactured by Avecia Pigments & Additives), 1,2-hydroxystearic acid oligomers, beef tallow diamine oleate salts ("Duomine" manufactured by Lion-Akzo), and the like.

The amount of the surfactant to be used is preferably from 10 to 500% by weight, more preferably from 20 to 300% by weight relative to the inorganic components.

In particular, the silica particles are preferably subjected to surface treatment with a silane coupling agent. A silane coupling agent is a compound having a structure wherein alkoxy group(s) and alkyl group(s) having functional group(s) are bonded to a silicon atom and plays a role of making the surface of the silica particles hydrophobic.

The silane coupling agent of the invention is not particularly limited but a trialkoxysilane having a radiation-curable functional group is particularly preferred. Specific examples thereof include epoxycyclohexylethyltrimethoxysilane, glycidoxypropyltrimethoxysilane, vinyltrimethoxysilane, vinyltriethoxysilane, acryloxypropyltrimethoxysilane, methacryloxypropyltrimethoxysilane, mercaptopropyltrimethoxysilane, mercaptopropyltriethoxysilane, and the like.

In the surface treatment, an Si—O—Si bond is formed between the alkoxy group of the silane coupling agent and the hydroxyl group on the surface of the silica particles via dealcoholation.

The amount of the silane coupling agent of the invention to be used is preferably 1% by weight or more, more preferably 3% by weight or more, further preferably 5% by weight or more based on the silica particle.

When the amount of the silane coupling agent to be used is too small, the surface of the silica particle is not sufficiently rendered hydrophobic and a homogeneous mixing with the monomer and/or the oligomer thereof is disturbed in some cases. Contrarily, when the amount is too large, a large amount of the silane coupling agent which is not bonded to the silica particles may contaminated, which may tend to adversely affect on transparency and mechanical properties of the resulting cured product, so that the case is not preferred. Thus, the amount is preferably 400% by weight or less, more preferably 350% by weight, further preferably 300% by weight.

The silane coupling agent is partially hydrolyzed at the surface treatment of the silica particles in some cases. Therefore, the composition after the silica particle is subjected to the surface treatment with the silane coupling agent contains the silica particle composed of a hydrolyzate of the oligomer of the alkoxysilane which is surface-treated with the compound selected from the group consisting of the silane coupling agent, hydrolyzates of the silane coupling agent, and the condensate thereof.

In addition, there exist condensates of the silane coupling agents themselves and/or of the silane coupling agent and hydrolyzates thereof in some cases. The hydrolyzates of the silane coupling agent mean compounds wherein part or all of the alkoxysilane groups contained in the silane coupling agent are converted into a hydroxysilane, i.e., a silanol group. For example, in the case that the silane coupling agent is epoxycyclohexylethyltrimethoxysilane, epoxycyclohexylethylhydroxydimethoxysilane, epoxycyclohexylethyldihydroxymethoxysilane, and epoxycyclohexylethyltrihydroxysilane correspond to the hydrolyzates.

The condensates of the silane coupling agents themselves and/or of the silane coupling agent and hydrolyzate thereof mean compounds wherein an alkoxy group forms an Si—O—Si bond via dealcoholation between the alkoxy group and the silanol group or compound wherein a silanol group forms an Si—O—Si bond via dehydration between the silanol group and another silanol group.

(Monomer and/or Oligomer thereof)

The radiation-curable resin composition of the invention comprises a monomer and/or an oligomer thereof.

The content of the monomer and/or the oligomer thereof is usually preferably 40% by weight or more, further preferably 50% by weight or more in the radiation-curable resin composition. The upper limit is preferably 95% by weight or less, further preferably 90% by weight or less. When the amount is too small, moldability and mechanical strength at the formation of the cured product decrease and crack is apt to occur, so that the case is not preferred. Contrarily, when the amount is too large, the surface hardness of the cured product lowers, so that the case is not preferred.

The monomer and/or an oligomer thereof usually have a radiation-curable functional group. The radiation-curable functional group is not particularly limited as far as it is a group having curability with a radiation and includes a group having radical reactivity, a group having photo-cationic reactivity, such as a photo-cationically curable glycidyl group, a group having photo-anionic reactivity, and photo-thiol-ene reactivity such as a thiol group. Of these, the group having radical reactivity is preferred.

Examples of such a functional group having radical reactivity include a (meth)acryloyl group, a vinyl group, and the like. Of these, the (meth)acryloyl group is particularly preferred in view of polymerization rate, transparency, and coating properties. In the case that the (meth)acryloyl group is used, it is sufficient that 50% or more of total number of the radiation-curable functional groups is the (meth)acryloyl group. The term "(meth)acrylate" herein means either an acrylate or a methacrylate.

Furthermore, the monomer and/or the oligomer thereof are preferably mainly composed of a compound having two or more radiation-curable groups in one molecule. The term "mainly" means 50% by weight or more of all the monomer and/or the oligomer thereof. In this case, a three-dimensional reticular structure is formed by polymerization with a radiation to afford an insoluble and infusible cured resin product.

In the invention, by polymerizing a radiation-curable functional group with a radiation such as an active energy ray (e.g., an ultraviolet ray) or an electron beam, the ultrafine particles can be rapidly cured in a highly dispersed state. The radiation curing usually proceeds very rapidly on a second time scale. Therefore, it is possible to prevent unfavorable phenomena such as migration and aggregation of the ultrafine particles during the curing process and hence a cured resin product having a high transparency can be obtained. However, since thermal polymerization takes longer time, i.e., several tens minutes to several hours, there is a possibility that the ultrafine particles migrate and aggregate to result in white turbidity, so that the case is not preferred.

In the invention, only a monomer may be used, only an oligomer may be used, or a mixture of both may be used. Since most of monomers are liquids having a lower viscosity as compared with oligomers, the former is advantageous in the case that the other components are mixed therewith. Moreover, there is an advantage that coating or molding such as injection molding is easy. However, some monomers are toxic and hence caution should be paid. On the other hand, oligomers generally have high viscosity and handling thereof is difficult in some cases. However, there is a tendency that oligomers are excellent in surface hardness and small in shrinkage at curing and also there is an advantage that most of them are satisfactory in mechanical properties of the cured product, particularly tensile properties and flexure properties.

Moreover, in the invention, the monomer and the oligomer thereof may be hydrophilic but are preferably hydrophobic.

As the monomer and/or the oligomer thereof, use of an oligomer having a relatively high molecular weight is particularly preferred. Preferably, it has a molecular weight of 1,000 or more, more preferably a molecular weight of 2,000 or more. The upper limit of the molecular weight of the oligomer is not particularly present but is usually 50,000 or less, preferably 30,000 or less, further preferably 20,000 or less, more preferably 10,000 or less, particularly preferably 5,000 or less.

By using such an oligomer having a relatively high molecular weight, there is a tendency that the surface hardness and adhesion of the cured product are improved. The reason is not clear but it is presumed that, since a composition containing the oligomer tends to exhibit small shrinkage at curing, an efficient curing due to a relatively small functional group density, a small residual strain at the adhesion interface due to shrinkage at curing, and the like may relates to the enhancement of the surface hardness and adhesion. The oligomer having a relatively high molecular weight may be used singly or as a mixture of two or more of the oligomers. In addition, the oligomer may be used in combination with the other monomer or oligomer having a more small molecular weight.

In the case that an oligomer having an extremely high molecular weight is used, the viscosity of the composition increases and thus moldability and operability become worse in some cases. In this case, the defects can be improved by increasing the amount of an oligomer having a low molecular weight, a monomer, or a reactive diluent.

The monomer and/or the oligomer thereof are not particularly limited but are preferably a monomer having a group capable of forming an intramolecular hydrogen bond or an intermolecular hydrogen bond and/or an oligomer thereof. The monomer having a group capable of forming an intramolecular hydrogen bond or an intermolecular hydrogen bond and/or the oligomer thereof is a monomer and/or an oligomer thereof having a group containing an easily freed hydrogen atom in the molecule of the monomer and/or oligomer and capable of forming an intramolecular or intermolecular hydrogen bond with the hydrogen atom. Examples of the group containing an easily freed hydrogen atom include a hydroxyl group, a formyl group, a carboxyl group, a mercapto group, a thioformyl group, a thiocarboxyl group, a sulfinyl group, a sulfo group, a sulfamoyl group, a sulfoamino group, an amino group, an imino group, a carbamoyl group, an amido group, and the like. Further preferred are a hydroxyl group and an amido group. By the intramolecular or intermolecular hydrogen bonds formed with these groups, aggregation ability of the organic molecules is increased and thus free migration of oxygen in the composition is inhibited, so that inhibition of radical polymerization is suppressed and surface hardness is enhanced.

The monomer and/or the oligomer thereof are more preferably a monomer having a urethane bond or a hydroxyalkylene group and/or an oligomer thereof. Particularly preferred is a monomer having a urethane bond and/or an oligomer thereof.

Moreover, in the case that a monomer of a condensed alicyclic acrylate and/or an oligomer thereof is used as the monomer and/or the oligomer thereof, the monomer and/or the oligomer thereof are preferably used not singly but in combination with a monomer having a urethane bond or a hydroxyalkylene group and/or an oligomer thereof. The condensed alicyclic acrylate is a compound containing a condensed aliphatic cyclic hydrocarbon group and an acryloyl group and specific examples thereof include condensed alicyclic diacrylate monomers and/or oligomers thereof such as bis(hydroxymethyl)tricyclo[$5.2.1.0^{2,6}$] decane=dimethacrylate, bis(hydroxymethyl)tricyclo [$5.2.1.0^{2,6}$]decane=diacrylate, bis(hydroxymethyl)tricyclo [$5.2.1.0^{2,6}$]decane=dimethacrylate, and mixtures thereof, bis (hydroxymethyl)pentacyclo[$6.5.1.1^{3,6}.0^{2,7}.0^{9,13}$] pentadecane=diacrylate, bis(hydroxymethyl)pentacyclo

[6.5.1.1$^{3,6}$.0$^{2,7}$.0$^{9,13}$]-pentadecane=dimethacrylate, bis(hydroxymethyl)pentacyclo[6.5.1.1$^{3,6}$.0$^{2,7}$.0$^{9,13}$]pentadecane=acrylate methacrylate, and mixtures thereof, and the like.

(1) Monomer Having Urethane Bond or Hydroxyalkylene Group and/or Oligomer thereof:

In the case that a monomer having a urethane bond or a hydroxyalkylene group and/or an oligomer thereof is used as the monomer and/or oligomer to be used in the radiation-curable resin composition of the invention, there is an advantage that the adhesion and surface hardness of the resulting cured resin product increase.

The phenomenon that adhesion is improved when the monomer having a urethane bond or a hydroxyalkylene group and/or oligomer thereof is used seems to be derived from increased interaction with an adherent material by the electric polarity of the urethane bond or the hydroxyalkylene group.

Moreover, the reason why the surface hardness is improved when the monomer having a urethane bond or a hydroxyalkylene group and/or oligomer thereof is used is not clear but it is presumed to be a main reason that the aggregation ability of the organic molecules is enhanced and, as a result, free migration of oxygen in the composition is inhibited and the inhibition of the radical polymerization is suppressed since the intramolecular hydrogen bond and intermolecular hydrogen bond derived from the electric polarity of the urethane bond or the hydroxyalkylene group are easily formed in the composition containing a certain amount or more of the monomer having a urethane bond or a hydroxyalkylene group and/or the oligomer thereof.

In the invention, the monomer having a urethane bond or a hydroxyalkylene group and/or an oligomer thereof preferably have a radiation-curable functional group. Thereby, since the monomer having a urethane bond or a hydroxyalkylene group and/or the oligomer thereof are incorporated into the radiation-cured reticular structure and are integrated, there is an advantage that the aggregation ability increases and, as a result, cohesion failure is difficult to occur and adhesion is improved. Moreover, since the effect of restricting the free migration of oxygen is enhanced, there is an advantage that surface hardness is also improved.

As a process for producing the monomer having a urethane bond, the production may be performed in accordance with a known process, for example, a process of reacting a chloroformate ester with ammonia or an amine, a process of reacting an isocyanate with a hydroxyl group-containing compound, a process of reacting urea with a hydroxyl group-containing compound. In the case that the monomer has a reactive group, it can be oligomerized. Of these processes, it is convenient to use a urethane oligomer and the urethane oligomer may be usually produced by adding a compound having two or more isocyanate groups in the molecule with a compound containing a hydroxyl group in accordance with a usual manner.

Examples of the compound having two or more isocyanate groups in the molecule include polyisocyanates such as tetramethylene diisocyanate, hexamethylene diisocyanate, trimethylhexamethylene diisocyanate, bis(isocyanatomethyl)cyclohexane, cyclohexane diisocyanate, bis(isocyanatocyclohexyl)methane, isophorone diisocyanate, tolylene diisocyanate, xylylene diisocyanate, diphenylmethane diisocyanate, m-phenylene diisocyanate, and naphthalene diisocyanate.

Of these, in view of good hue of the resulting composition, it is preferred to use bis(isocyanatomethyl)cyclohexane, cyclohexane diisocyanate, and bis(isocyanatocyclohexyl)methane singly or in combination of two or more of them.

As the compound containing a hydroxyl group, a polyol containing two or more hydroxyl groups is preferably used and specific examples thereof include alkyl polyols such as ethylene glycol, propylene glycol, butylene glycol, neopentyl glycol, trimethylolpropane, pentaerythritol, sorbitol, mannitol, and glycerin and polyether polyols which are oligomers thereof, and polyester polyols such as polyester polyols synthesized from these polyols or polyhydric alcohols and polybasic acids and polycaprolactone polyols, and the like.

The urethane oligomer thus obtained preferably contains the polyether polyol as the compound containing a hydroxyl group. The average content of the constitutive unit derived from the polyether polyol in the urethane oligomer is preferably 20% by weight or more, further preferably 25% by weight or more, particularly preferably 30% by weight or more. Moreover, the upper limit is not particularly limited but is preferably 90% by weight or less, further preferably 80% by weight or less, particularly preferably 70% by weight or less.

When the content of the polyether polyol is too small, the cured product becomes brittle, and also the elastic modulus is too high and hence internal stress is apt to occur, which tends to cause deformation. When the content is too large, there is a tendency to cause problems that the surface hardness as the cured product decreases and the product easily get scratched.

The addition reaction of the isocyanate compound with the hydroxyl compound can be carried out by a known process, for example, by adding dropwise a mixture of a hydroxyl compound and an addition catalyst, e.g., dibutyltin laurate in the presence of an isocyanate compound under a condition of 50 to 90° C.

In particular, at the synthesis of a urethane acrylate oligomer, it can be produced by using a compound having both of a hydroxyl group and a (meth)acryloyl group as part of the above compound containing a hydroxyl group. The amount thereof to be used is usually from 30 to 70% in all the hydroxyl-containing compounds and the molecular weight of the resulting oligomer can be controlled according to the ratio.

Examples of the compound having both of a hydroxyl group and a (meth)acryloyl group include hydroxylethyl (meth)acrylate, hydroxypropyl (meth)acrylate, hydroxybutyl (meth)acrylate, addition products of glycidyl ether compounds with (meth)acrylic acid, mono(meth)acrylates of glycol compounds, and the like.

By adding one molecule of the compound having two or more isocyanate group in the molecule with two molecules of the compound having both of a hydroxyl group and a (meth)acryloyl group, a urethane oligomer having (meth)acryloyl groups at the both terminals can be produced.

In particular, the urethane oligomer having (meth)acryloyl groups at the both terminals has an advantage that the adhesion and surface hardness of the resulting cured resin product further increase.

In the invention, the monomer having a urethane bond and/or the oligomer thereof preferably have further an acid group. The presence of the oxygen group results in an advantage that the adhesion with the adherent material is improved even in the passage of time.

The acid group herein means a functional group having acidity and examples of the acid group include a sulfonic acid group, a phosphoric acid group, a carboxyl group, and neutral salts with a tertiary amine or metal salts thereof.

In this case, as the compounds to be used in the process for producing the above monomer having a urethane bond and/or the oligomer thereof, compounds having these acid groups may be suitably used but particularly at the production of the oligomer, it is preferred to use a hydroxyl group-containing compound having an acid group among them.

As the hydroxyl group-containing compound having an acid group, a polyol containing two or more hydroxyl groups is preferably used. Specific examples of the polyol having an acid group include sulfonate salts and alkali metal salts and amine slats thereof such as 2-sulfo-1,4-butanediol and alkali metal salts thereof including sodium salt, 5-sulfo-di-β-hydroxyethyl isophthalate and alkali metal salts thereof including sodium salt, N,N-bis(2-hydroxyethyl)aminoethylsulfonic acid and tetramethylammonium salt thereof, tetraethylammonium salt thereof, and benzyltriethylammonium salt thereof; phosphate esters and amine salts and alkali metal salts thereof such as bis(2-hydroxyethyl) phosphate and tetramethylammonium salts thereof and alkali metal salts thereof including sodium salt; alkanolcarboxylic acids and caprolactone adducts thereof such as dimethylolacetic acid, dimethylolpropionic acid, dimethylolbutanoic acid, dimethylolheptanoic acid, dimethylolnonanoic acid, and dihydroxybenzoic acid; or compounds having two or more hydroxyl groups and a carboxyl group in one molecule such as half ester compounds of polyoxypropylenetriol with maleic anhydride or phthalic anhydride, and the like. Of these, preferred are compounds having a carboxyl group as the acid group.

Incidentally, for incorporation of the acid group into the monomer having a urethane bond and/or the oligomer thereof, in addition to the processes such as use of an isocyanate group-containing compound having an acid group and/ or use of a hydroxyl group-containing compound having an acid group, there can be adopted a process of introducing an acid group into the monomer having a urethane bond and/or the oligomer thereof by reacting the monomer having a urethane bond and/or the oligomer thereof with a compound having at least one functional group reactive to an isocyanate group other than a hydroxyl group, such as an amino group, and also having an acid group. As the compound in that case, 1-carboxy-1,5-pentyldiamine, 3,5-diaminobenzoic acid, and the like may be specifically mentioned.

The content of the acid group in the acid group-containing monomer having a urethane bond and/or the oligomer thereof is preferably $0.5 \times 10^{-4}$ eq/g or more, further preferably $1.5 \times 10^{-4}$ eq/g or more relative to the monomer having a urethane bond and/or the oligomer thereof. Also, the content is preferably $30 \times 10^{-4}$ eq/g or less, further preferably $8 \times 10^{-4}$ eq/g or less.

In the case that the above acid group-containing monomer having a urethane bond and/or the oligomer thereof is used, the amount of the acid group derived from the monomer having a radiation-curable group and/or the oligomer thereof in the whole composition is preferably controlled so as to be $0.1 \times 10^{-4}$ eq/g or more, and further preferred is $1 \times 10^{-4}$ eq/g or more and particularly preferred is $1.5 \times 10^{-4}$ eq/g or more. Also, the amount is controlled so as to be preferably $13 \times 10^{-4}$ eq/g or less, further preferably $10 \times 10^{-4}$ eq/g or less, particularly preferably $4 \times 10^{-4}$ eq/g or less.

When the content of the acid group is too small, the effect of improving interlayer adhesion as the cured product is insufficient and not only exfoliation is apt to occur but also the cured product which is combined with the silica particles to be mentioned below tends to be brittle. Contrarily, when the content is too large, the flexibility as the cured product decreases and rather interlayer adhesion tends to lower.

The hydroxyalkylene group-containing radiation-curable monomer of the invention means mainly a so-called epoxy (meth)acrylate. The epoxy (meth)acrylate can be produced by reacting an epoxy compound having at least one epoxy group in one molecule with an unsaturated monobasic acid in the presence of a particular esterification catalyst and a polymerization inhibitor.

As the epoxy compound, use can be made of an epoxy compound obtained by the reaction of bisphenol A and/or F compound(s) with epichlorohydrin and having an epoxy equivalent of 170 to 2000, preferably an epoxy equivalent of 170 to 1000 which is low in viscosity. In addition, use can be also made of an epoxy compound obtained by the reaction of a brominated bisphenol A compound with epichlorohydrin, an epoxy compound obtained by the reaction of a hydrogenated bisphenol A compound with epichlorohydrin, and further novolak-type epoxy compounds such as phenol novolak-type epoxy compounds and cresol novolak-type epoxy compounds. These epoxy compounds can be used singly or as a mixture of two or more of them. Of these, bisphenol A and/or F compound(s) are preferred owing to the excellent flowability, impact resistance, and boiling resistance and a good adhesion to the adherent material.

The unsaturated monobasic acid to be reacted with such an epoxy compound is not particularly limited but examples thereof include acrylic acid, methacrylic acid, crotonic acid, cinnamic acid, acrylic acid dimer, and the like. These acids can be used singly or in combination of two or more of them.

The mixing ratio of the epoxy compound with the unsaturated monobasic acid is usually in the range of 0.9 to 1.2 equivalents of the carboxyl group in the unsaturated monobasic acid to the epoxy group in the epoxy compound, and particularly, the range of $1 \pm 0.05$ equivalents is preferred in view of obtaining a resin excellent in curability and storage stability. When the mixing ratio is smaller than the range, the remaining amount of the epoxy group becomes large and hence a side product of the reaction of the epoxy group with the secondary hydroxyl group in the epoxy acrylate forms and also storability remarkably lowers. When the mixing ratio is larger than the range, the curing time is extremely lengthened, so that the case is not preferred.

In the invention, the monomer having a hydroxyalkylene group and/or the oligomer thereof preferably has further an acid group. As the acid group, there may be mentioned those the same as described in the explanation of the acid group to be contained in the above monomer having a urethane bond and/or the oligomer thereof.

The process for incorporating an acid group into the monomer having a hydroxyalkylene group and/or the oligomer thereof is not particularly limited and a known method may be used. For example, as a process for introducing a carboxyl group, a process of reacting a cyclic acid anhydride with a hydroxyl group may be mentioned.

The acid anhydride in this case is not particularly limited but, for example, use can be made of maleic anhydride, succinic anhydride, phthalic anhydride, pyromellitic anhydride, trimellitic anhydride, naphthalene-1,8:4,5-tetracarboxylic dianhydride, cylohexane-1,2,3,4-tetracarboxylic=3,4-anhydride, tetrahydrophthalic anhydride, hexahydrophthalic anhydride, 4-methyl-hexahydrophthlic anhydride, methyltetrahydrophthalic anhydride, and the like. Of these, maleic anhydride and succinic anhydride are particularly preferred in view of transparency and light resistance.

As the process of reacting a cyclic acid anhydride with the hydroxyl group of the hydroxyalkylene group-containing radiation-curable resin monomer or oligomer, there may be mentioned a process of mixing them and subsequently stirring the mixture at a temperature of the range of room temperature to 150° C., preferably 40 to 100° C. for several hours, and the like process.

As the above monomer and/or oligomer thereof, a highly transparent material is preferred and, for example, a compound having no aromatic ring is preferred. In the case of the resin compound and the cured product thereof using a monomer containing an aromatic ring and/or an oligomer thereof, the resulting one is a colored product or is colored or increasingly colored during the storage even when it is not initially colored, that is, there is observed so-called yellowing. It is considered to be the cause thereof that the double bond parts forming the aromatic ring are irreversibly changed in structure by an energy ray.

Therefore, there is an advantage that the monomer and/or the oligomer thereof exhibit no deterioration of hue and no decrease in light transmittance when they have a structure containing no aromatic ring and hence they are particularly suitable for the application to the uses where colorlessness and transparency are required.

Among the monomers having a urethane bond and/or the oligomers thereof, the monomer having no aromatic ring and/or the oligomer thereof can be produced by subjecting an isocyanate group-containing compound having no aromatic ring and a hydroxyl group-containing compound having no aromatic ring to an addition reaction in the above production process.

For example, it is preferred to use one or two or more of bis(isocyanatomethyl)cyclohexane, cyclohexane diisocyanate, bis(isocyanatocyclohexyl)methane, and isophorone diisocyanate singly or in combination as the isocyanate compound.

Among the monomers having a hydroxyalkylene group and/or the oligomers thereof, the monomer having no aromatic ring and/or the oligomer thereof can be produced by reacting an epoxy compound having no aromatic ring and an unsaturated monobasic acid having no aromatic ring in the above production process. As the epoxy compound having no aromatic ring, it is preferred to use an epoxy compound obtained by the reaction of an epoxy compound having no aromatic ring, such as a hydrogenated bisphenol A-type epoxy compound, a hydrogenated bisphenol F-type epoxy compound, or 3,4-epoxycyclohexylmethyl-3,4-epoxycyclohexanecarboxylate, with epichlorohydrin.

(2) Other Resin Monomer and/or Oligomer thereof

In the case that the above monomer having a urethane bond or a hydroxyalkylene group and/or the oligomer thereof are used as the monomer and/or the oligomer thereof, they may be mixed with another radiation-curable monomer and/or oligomer thereof, preferably a bifunctional or trifunctional (meth)acrylate compound. The amount of the other radiation-curable monomer and/or oligomer thereof to be used is preferably 50% by weight or less, further preferably 30% by weight or less relative to the composition other than the inorganic component.

As the bifunctional or trifunctional (meth)acrylate compound, there may be mentioned aliphatic poly(meth)acrylates, alicyclic poly(meth)acrylates, and aromatic poly(meth)acrylates. Specific examples thereof include divalent (meth)acrylates such as triethylene glycol di(meth)acrylate, hexanediol di(meth)acrylate, 2,2-bis[4-(meth)acryloyloxyphenyl]propane, 2,2-bis[4-(2-(meth)acryloyloxyethoxy)phenyl]propane, bis(hydroxymethyl)tricyclo[5.2.1.0$^{2,6}$]decane=di(meth)acrylate, p-bis[β-(meth)acryloyloxyethylthio]xylylene, and 4,4'-bis[β-(meth)acryloyloxyethylthio]diphenylsulfone; trivalent (meth)acrylates such as trimethylolpropane tris(meth)acrylate, glycerin tris(meth)acrylate, and pentaerythritol tris(meth)acrylate; tetravalent (meth)acrylates such as pentaerythritol tetrakis(meth)acrylate; indefinite polyvalent (meth)acrylates such as epoxyacrylates, and the like. Of these, the above divalent (meth)acrylates are preferably used in view of controllability of a crosslink-forming reaction.

Moreover, for the purpose of improving the thermal resistance and surface hardness of the crosslinked structure of the cured product, trifunctional or higher functional (meth)acrylates are preferably added. Specific examples thereof include trifunctional (meth)acrylates having an isocyanurate skeleton in addition to the trimethylolpropane tris(meth)acrylate and the like exemplified in the above.

Furthermore, for the purpose of improving adhesiveness and adhesion, a (meth)acrylate compound containing a hydroxyl group is preferably added. Specific examples of the compound include hydroxyethyl (meth)acrylate and the like.

Among the (meth)acrylates exemplified in the above, it is particularly preferred to add and use the following component A and the following component B.

The component A is a bis(meth)acrylate having an alicyclic skeleton represented by the following formula (1).

Chemical Formula 1

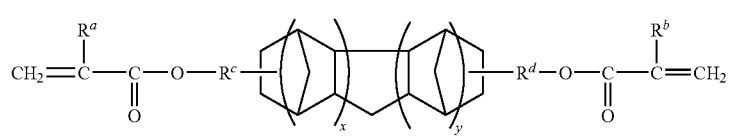

(1)

In the above formula (1), $R^a$ and $R^b$ each independently represents a hydrogen atom or a methyl group, $R^c$ and $R^d$ each independently represents an alkylene group having 6 or less carbon atoms, x represents 1 or 2, and y represents 0 or 1.

Specific examples of the component A represented by the formula (1) include bis(hydroxymethyl)tricyclo[5.2.1.0$^{2,6}$]decane=diacrylate, bis(hydroxymethyl)tricyclo[5.2.1.0$^{2,6}$]decane=dimethacrylate, bis(hydroxymethyl)tricyclo[5.2.1.0$^{2,6}$]decane=acrylate methacrylate, and mixtures thereof, bis(hydroxymethyl)pentacyclo[6.5.1.1$^{3,6}$.0$^{2,7}$.0$^{9,13}$]pentadecane=diacrylate, bis(hydroxymethyl)pentacyclo[6.5.1.1$^{3,6}$.0$^{2,7}$.0$^{9,13}$]-pentadecane=dimethacrylate, bis(hydroxymethyl)pentacyclo[6.5.1.1$^{3,6}$.0$^{2,7}$.0$^{9,13}$]pentadecane=acrylate methacrylate, and mixtures thereof, and the like. A plurality of these tricyclodecane compounds and pentacyclodecane compounds may be used in combination.

The component B is a bis(meth)acrylate having a sulfur atom represented by the following formula (2).

Chemical Formula 2

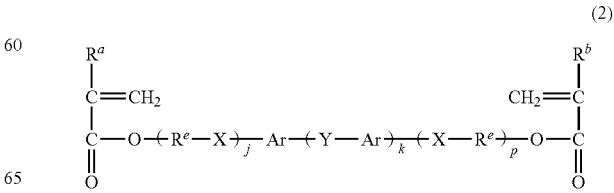

(2)

In the above formula (1), $R^a$ and $R^b$ may be the same as $R^a$ and $R^b$ in the above general formula (1) and each $R^e$ represents an alkylene group having 1 to 6 carbon atoms. Each Ar represents an arylene group or an aralkylene group having 6 to 30 carbon atoms and these hydrogen atoms may be substituted by a halogen atom other than a fluorine atom. Each X represents an oxygen atom or a sulfur atom. In the case that each X is all an oxygen atom, at least one of each Y represents a sulfur atom or a sulfone group (—SO$_2$—) and in the case that at least one of each X is a sulfur atom, each Y represents any one of an sulfur atom, a sulfone group, a carbonyl group (—CO—), and an alkylene group, an aralkylene group, an alkylene ether group, an aralkylene ether group, an alkylene thioether group, and an aralkylene thioether group each having 1 to 12 carbon atoms. Moreover, j and p each independently represents an integer of 1 to 5 and k represents an integer of 0 to 10. Furthermore, when k is 0, x represents a sulfur atom.

Specific examples of the component B represented by the above general formula (2) include α,α'-bis[β-(meth)acryloyloxyethylthio]-p-xylene, α,α'-bis[β-(meth)acryloyloxyethylthio]-m-xylene, α,α'-bis[β-(meth)acryloyloxyethylthio]-2,3,5,6-tetrachloro-p-xylene, 4,4'-bis[β-(meth)acryloyloxyethoxy]diphenyl sulfide, 4,4'-bis[β-(meth)acryloyloxyethoxy]diphenyl sulfone, 4,4'-bis[β-(meth)acryloyloxyethylthio]diphenyl sulfide, 4,4'-bis[β-(meth)acryloyloxyethylthio]diphenyl sulfone, 4,4'-bis[β-(meth)acryloyloxyethylthio]diphenyl ketone, 2,4'-bis[β-(meth)acryloyloxyethylthio]diphenyl ketone, 5,5'-tetrabromodiphenyl ketone, β,β'-bis[p-(meth)acryloyloxyphenylthio]diethyl ether, β,β'-bis[p-(meth)acryloyloxyphenylthio]diethyl thioether, and the like. A plurality of these compounds may be used in combination.

Of the above respective components, bis(hydroxymethyl)tricyclo[5.2.1.0$^{2,6}$]decane=dimethacrylate has excellent transparency and thermal resistance and hence is particularly suitably used.

(Reactive Diluent)

For the purpose of adjusting the viscosity of the composition, a reactive diluent may be added to the radiation-curable resin composition of the invention. The amount of the reactive diluent to be used is from 0.5 to 80% by weight, preferably from 1 to 50% by weight. When the amount is too small, the effect of dilution is small. On the other hand, when the amount is too large, the cured product is apt to become brittle, mechanical strength tends to be lowered, and shrinkage at curing becomes large. Thus, the cases are not preferred. In the invention, the reactive diluent is a liquid compound having a low viscosity and is usually a monofunctional low-molecular-weight compound. For example, compounds having a vinyl group or a (meth)acryloyl group and mercaptans may be mentioned.

In the invention, a compound having a radiation-curable group such as a vinyl group or a (meth)acryloyl group and the like are mentioned as the reactive diluent. Specific examples of such a compound include aromatic vinyl monomers, vinyl ester monomers, vinyl ethers, (meth)acrylamides, (meth)acrylate esters, and di(meth)acrylates but preferred are compounds having no aromatic ring in view of hue and light transmission. Of these, use can be particularly preferably made of (meth)acryloylmorpholine, tetrahydrofurfuryl (meth)acrylate, benzyl (meth)acrylate, a (meth)acrylate having an alicyclic skeleton such as cyclohexyl (meth)acrylate or a (meth)acrylate having a tricyclodecane skeleton, a (meth)acrylamide such as N,N-dimethylacrylamide, an aliphatic (meth)acrylate such as hexanediol di(meth)acrylate or neopentyl glycol di(meth)acrylate in view of good hue and viscosity.

Moreover, compounds having both of a hydroxyl group and a (meth)acryloyl group, such as hydroxyethyl (meth)acrylate, hydroxypropyl (meth)acrylate, and hydroxybutyl (meth)acrylate can be used for the purpose. The case is preferred since adhesion of the composition to glass is improved in some cases.

(Polymerization Initiator)

In the radiation-curable resin composition of the invention, it is usually preferred to add a polymerization initiator in order to initiate the polymerization reaction which proceeds with an active energy ray (e.g., an ultraviolet ray). Such a polymerization initiator is generally a radical generator which is a compound having a property of generating a radical by a light, and known such compounds can be employed. Examples of such a radical generator include benzophenone, benzoin methyl ether, diethoxyacetophenone, 1-hydroxycyclohexyl phenyl ketone, 2,6-dimethylbenzoyldipenylphosphine oxide, 2,4,6-trimethylbenzoyldiphenylphosphine oxide, and the like. A plurality of these compounds may be used in combination. Of these, preferred are 1-hydroxycyclohexyl phenyl ketone, 2,4,6-trimethylbenzoyldiphenylphosphine oxide, and benzophenone.

The amount of such a polymerization initiator is usually 0.001 part by weight, preferably 0.01 part by weight, further preferably 0.05 part by weight or more relative to 100 parts by weight of total of the monomer having a radiation-curable functional group and/or the oligomer thereof. However, the amount is usually 10 parts by weight or less, preferably 8 parts by weight or less. When the amount to be added is two large, not only the polymerization reaction proceeds rapidly to result in the increase of optical distortion but also hue deteriorates in some cases. When the amount is too small, the composition cannot be sufficiently cured in some cases.

Moreover, in the case that the polymerization reaction is initiated by an electron beam, the above polymerization initiator can be used but it is preferred to use no polymerization initiator.

(Surface Tension Adjuster)

The surface tension adjuster of the invention is used for the purpose of lowering the surface tension of the composition and improving applicability to a substrate.

Specific examples thereof include low-molecular-weight and high-molecular-weight surfactants and silicone compounds and various modifications thereof (polyether modification, fluorine modification, etc.), sorbitan esters, other various leveling agents, antifoaming agents, rheology controlling agents, releasing agents, and the like. Of these, silicone compounds such as Polyflow KL510 (manufactured by Kyoeisha Chemical, Co., Ltd.) are particularly preferred and furthermore, polyether-modified silicone compounds such as KF351A (manufactured by Shin-Etsu Chemical Co., Ltd.) and fluorine-modified surfactants are preferred since not only the surface tension can be preferably lowered but also they exhibit a property of hardly causing coating defects and excellent in antifouling property, sliding property, and weather resistance.

The amount of the surface tension adjuster to be added varies depending on its kind but is usually 5% by weight or less, preferably 3% or less, more preferably in the range of 0.01 to 1% by weight based on the composition.

(Solvent)

In the curable resin composition, a solvent may be used. The solvent is preferably colorless and transparent. Specifically, one kind or two or more kinds of alcohols, glycol derivatives, hydrocarbons, esters, ketones, ethers, and the like may be used singly or in combination. Specific examples of the alcohols include methanol, ethanol, isopropyl alcohol, n-butyl alcohol, isobutyl alcohol, octanol, n-propyl alcohol, acetylacetone alcohol, and the like. Specific examples of the ketones include acetone, methyl ethyl ketone, methyl isobutyl ketone, and the like. Of these, methanol, ethanol, or acetone is particularly preferred. However, the amount of the solvent to be used is preferably as small as possible in view of the operability at curing.

The amount is preferably 95% or less, further preferably 30% or less, more preferably 20% or less, particularly preferably 10% or less, especially preferably 5% or less based on the composition, and most preferred is no solvent.

(Auxiliary Components)

To the curable resin composition, auxiliary components such as additives may be added, if necessary, unless the cured resin product produced does not remarkably deviate the purpose of the invention.

Examples of the other auxiliary components include stabilizers such as antioxidants, heat stabilizers, or light absorbents; fillers such as glass fibers, glass beads, mica, talc, kaolin, metal fibers, and metal powders; carbon materials such as carbon fibers, carbon black, graphite, carbon nanotube, fullerenes including $C_{60}$ (fillers, fullerenes, and the like are generally referred to as inorganic filler components); modifiers such as antistatic agents, plasticizers, releasing agents, antifoaming agents, leveling agents, antiprecipitating agents, surfactants, and thixotropic agents; colorants such as pigments, dyes, and hue-adjusting agents; monomers and/or oligomers thereof or curing agents, catalysts, and curing accelerators necessary for the synthesis of inorganic components; and the like.

The amount of these auxiliary components is not particularly limited unless the cured resin product produced does not remarkably deviate the purpose of the invention but the amount is usually 20% by weight or less of the radiation-curable resin composition.

Moreover, for the purpose of improving mechanical properties and thermal resistance and balancing various properties, a monomer and/or an oligomer other than the radiation-curable one may be further mixed with the radiation-curable resin composition of the invention. The kind of the monomer and/or oligomer is not particularly limited but specifically, a thermoplastic resin or a thermosetting resin monomer and/or an oligomer thereof is used.

Examples of the thermoplastic resin include polystyrene; polymethyl methacrylate; polyesters such as polyarylate and O-PET (manufactured by Kanebo, Ltd.); polycarbonate; polyether sulfones; cyclic thermoplastic resins such as Zeonex (manufactured by Zeon Corp.) and Arton (manufactured by JSR corp.); cyclic polyolefins such as Apel (manufactured by Mitsui Chemicals, Inc.); and the like. In view of transparency and dimensional stability, polycarbonate or polyether sulfones are preferred. The thermoplastic resin is preferably used in an amount of 20% by weight or less relative to the composition other than inorganic components.

As the thermosetting resin monomer and/or the oligomer thereof, epoxy resins; Ligolite (manufactured by Showa Denko K.K.); and the like. In view of transparency and dimensional stability, highly pure epoxy resins are preferred.

The thermosetting resin is preferably used in an amount of 50% by weight or less relative to the composition other than inorganic components.

The radiation-curable resin composition of the invention is characterized by the viscosity at 25° C. of 1,000 centipoises or more. Preferred is 2,000 poises or more. Moreover, it is characterized by the viscosity of 10,000 centipoises or less. Preferred is 5,000 centipoises or less. When the viscosity is less than 1,000 centipoises, it is difficult to form a cured product having a thickness of 50 µm or more and thus it is impossible to use it in applications of information recording media and the like, so that the case is not preferred. Contrarily, when the viscosity is larger than 5,000 centipoises, it is difficult to form a cured product having a smooth surface and hence the case is not preferred. The viscosity is suitably measured by means of an E-type viscosimeter, a B-type viscosimeter, or a vibration-type viscosimeter. As a method for adjusting the viscosity, there is a method of the addition of a diluent, the removal of the solvent, the control of the molecular weight of a radiation-curable oligomer, the addition of a thickening agent, the addition of a rheology regulator, or the like. Preferably, the addition of a diluent, the control of the molecular weight of a radiation-curable oligomer, or the addition of a thickening agent is used. More preferably, the addition of a diluent is used.

With regard to the transparency of the radiation-curable resin composition, it is sufficient that the cured product obtained by curing the composition is transparent to such a degree depending on the use thereof and the transparency of the composition itself is not particularly limited but the light transmittance at an optical path length of 0.1 mm at 550 nm is preferably 80% or more, more preferably 85% or more. More preferably, the light transmittance at an optical path length of 0.1 mm at 400 nm is 80% or more, more preferably 85% or more. When the light transmittance is too low, the transparency at curing tends to be impaired remarkably and read error may increase at reading of recorded information in the case that the cured product is used as an optical recording medium, so that the case is not preferred.

The radiation-curable resin composition has a surface tension at 25° C. of 40 mN/m or less, preferably 35 mN/m or less, more preferably 30 mN/m or less. When the surface tension is too high, coating-spreading property of the composition at coating becomes worse, which not only results in increased amount of the composition necessary at coating but also may cause defects, so that the case is not preferred. The surface tension is preferably as small as possible but is usually 10 mN/m or more. The surface tension is suitably measured by means of a tensiometer (e.g., Model CBVP-A3 manufactured by Kyowa Interface Science Co., Ltd.). As a method for adjusting the surface tension, the above addition of a surface tension adjuster may be mentioned.

The radiation-curable resin composition preferably contains substantially no solvent. To contain substantially no solvent means a state that the content of so-called organic solvent having volatility or a low boiling point is very small and the content of the solvent in the composition is usually preferably 5% or less, further preferably 3% or less, particularly preferably 1% or less, especially preferably 0.1% or less. Conventionally, it means a state that no odor of the organic solvent is observed. Moreover, as an alternative method, it means no occurrence of bubbles or white turbidity due to the evaporation of the solvent remaining in the cured product after the radiation-curable resin composition is spin-coated at a film thickness of 100±15 µm and is heated at 70° C. for 1 minute and the composition is irradiated with an ultraviolet ray of 3 J/cm² or an electron beam of 5 Mrad or is cured until the evaluation by an evaluation method of degree of surface curing reaches a state of ○.

(Process for Producing Radiation-Curable Resin Composition)

The radiation-curable resin composition of the invention is not particularly limited as far as the process is a process for homogeneously dispersing and mixing an inorganic component in a monomer and/or an oligomer thereof. Specifically, there are mentioned (1) a process of preparing an inorganic particle powder, subjecting it to a suitable surface treatment, and then directly dispersing it in the monomer and/or the oligomer thereof in a suitably liquefied state, (2) a process of synthesizing inorganic particles in the monomer and/or the oligomer thereof in a suitably liquefied state, (3) a process of preparing inorganic particles in a liquid medium, dissolving the monomer and/or the oligomer thereof in the liquid medium, and then removing the solvent, (4) a process of dissolving the monomer and/or oligomer thereof in a liquid medium, preparing inorganic particles in the liquid medium, and then removing the solvent, (5) a process of preparing inorganic particles and the monomer and/or the oligomer thereof in a liquid medium and then removing the solvent, and the like process.

Of these, the process (3) is most preferred since a composition having a high transparency and a good storage stability is easily obtained.

The above process (3) is preferably carried out by successively conducting the following steps:

(a) a step of synthesizing a silica particle by hydrolysis of an oligomer of an alkoxysilane at a temperature of 10 to 100° C. in a liquid medium, (b) a step of protecting the surface of the silica particle, (c) a step of mixing the monomer and/or the oligomer thereof, and (d) a step of removing the solvent at a temperature of 10 to 75° C.

According to the production process, a radiation-curable resin composition wherein silica ultrafine particles having a uniform particle size are highly dispersed can be easily obtained.

In the above step of (a), an oligomer of an alkoxysilane is hydrolyzed in a liquid medium by adding the oligomer of an alkoxysilane, a catalyst, and water to synthesize silica particles. The liquid medium is not particularly limited but is preferably a medium compatible to the monomer and/or the oligomer thereof. Specifically, a solvent, a surface treating agent, a diluent, or the like may be used. The surface treating agent and a diluent are as described above.

As the solvent, an alcohol or a ketone is preferably used and a $C_1$-$C_4$ alcohol, acetone, methyl ethyl ketone, or methyl isobutyl ketone is particularly preferably used. The liquid medium is preferably used in an amount of 0.3 to 10 times the amount of the alkoxysilane oligomer.

As the catalyst, use may be made of a hydrolysis catalyst such as an organic acid such as formic acid or maleic acid; an inorganic acid such as hydrochloric acid, nitric acid, or sulfuric acid; a metal complex compound such as acetylacetone aluminum, dibutyltin dilaurate, or dibutyltin dioctanoate; and the like. The amount thereof to be used is preferably from 0.1 to 3% by weight relative to the alkoxysilane oligomer.

Water is preferably added in an amount of 10 to 50% by weight relative to the alkoxysilane oligomer.

The hydrolysis is carried out at a temperature of 10 to 100° C. When the temperature is lower than the range, the reaction of forming silica particles does not sufficiently proceed, so that the case is not preferred. Contrarily, the temperature is too high, gelation of the oligomer tends to occur, so that the case is not preferred. The time for the hydrolysis is preferably from 30 minutes to 1 week.

The above reaction of (b) is a step of protecting the surface of the silica particles. As a surface protecting agent, a surfactant, a dispersant, a silane coupling agent, and the like may be mentioned.

In the case that a surfactant or a dispersant is used, there may be mentioned a method of adding a surface protecting agent and reacting it at a temperature of room temperature to 60° C. for about 30 minutes to 2 hours under stirring, a method of aging the product at room temperature for several days after the addition and the reaction, and the like. At the addition, it is important not to select a solvent exhibiting a very high solubility of the surface protecting agent. In the case of using the solvent exhibiting a very high solubility of the surface protecting agent, the protection of the inorganic component is not sufficiently performed or a lot of time is required for the protection process, so that the case is not preferred. In the case of the solvent exhibiting a very high solubility of the surface protecting agent, when a solvent exhibiting difference in solubility value (SP value) between the solvent and the surface treating agent of, for example, 0.5 or more is used, the protection of the inorganic component is sufficiently performed in may cases.

In the case that the silane coupling agent is used, the surface protecting reaction proceeds at room temperature (25° C.). Usually, the reaction is carried out by stirring for 0.5 to 24 hours but heating may be conducted at a temperature of 100° C. or lower. Upon heating, the reaction rate increases and thus the reaction can be completed within a short period. In the case that the silane coupling agent is used, water may be added. Water is usually added in the amount range necessary for hydrolysis of the alkoxy groups derived from the silane coupling agent and the remaining alkoxy groups derived from the alkoxysilane.

The silane coupling agent may be added a plurality of times with divided portions. At that time, water may be also added a plurality of times with divided portions and the amount is the same as described in the explanation of the amount of water to be added to the above silane coupling agent.

The above step of (c) should be performed after thorough completion of the above reaction of (b). The confirmation thereof can be achieved by measuring the remaining amount of the silane coupling agent in the reaction solution. Usually, it is the time when the remaining amount of the silane coupling agent in the reaction solution reaches 10% or less relative to the charged amount. When the operation of (c) is conducted before the above reaction of (b) thoroughly proceeds, the monomer and/or the oligomer may be not homogeneously mixed or the composition may become white turbid in a subsequent step, so that the case is not preferred. The step of (c) can be performed at room temperature (25° C.) but may be conducted under heating at 30 to 90° C. in the case that the viscosity of the monomer or oligomer is high or the melting point of the monomer or oligomer is higher than room temperature (25° C.). The time for mixing is preferably from 30 minutes to 5 hours.

In the above step of (d), solvents used as the liquid medium, an alcohol formed by hydrolysis of the alkoxysilane, and the like are removed. However, it is sufficient to remove the solvents within a necessary range and it is not necessary to remove them completely. It is preferred that the solvents are removed to an extent similar to the above composition containing substantially no solvent. In this connection, when the temperature is lower than the described range, the removal of the solvents is not sufficient, so that the case is not preferred. Contrarily, when the temperature is too high, the composition is apt to gelate, so that the case is not preferred. The temperature may be controlled stepwise. The time for the removal is preferably from 1 to 12 hours. Moreover, it is preferred to remove them under reduced pressure of 20 kPa or less, more preferably 10 kPa or less. Furthermore, it is preferred to remove them at 0.1 kPa or less. The pressure may be gradually reduced.

According to the preferred production process as described in the above, as compared with the method of adding a filler (e.g., silica particles) and a surface treating agent such as a silane coupling agent to the resin composition afterward to disperse the filler, there is an advantage that ultrafine particles having a smaller particle size can be dispersed even in an large amount without aggregation. Therefore, the resulting radiation-curable resin composition becomes a composition wherein silica particles are dispersed in an amount sufficient for enhancing dimensional stability and mechanical strength of the resin without impairing radiation transmittance.

Also, the resulting radiation-cured product obtained by curing it has transparency, high surface hardness, and low shrinkage at curing. In addition, the cured product has excellent properties of preferably both of dimensional stability and adhesion, further preferably also degree of surface curing, and particularly preferably adhesion durability.

(Radiation-Curing Conditions)

The cured product of the above radiation-curable resin composition is obtained by so-called "radiation-curing" where a polymerization reaction is initiated by irradiating the composition with a radiation (active energy ray or electron beam).

The mode of the polymerization reaction is not particularly limited and a known polymerization mode such as radical polymerization, anion polymerization, cation polymerization, or coordination polymerization can be employed. Among the examples of these polymerization modes, most preferred polymerization mode is radical polymerization. The reason is not clear but it is supposed that the reason is due to the homogeneity of the product by the fact that the initiation of the polymerization reaction proceeds homogeneously within a short period in a polymerization system.

The above radiation is an electromagnetic wave such as a γ-ray, an X-ray, an ultraviolet ray, a visual light, an infrared ray, or a micro wave or a particle beam such as an electron beam, an α-ray, a neutron radiation, or any of various atomic beams.

Examples of the radiations preferably used in the invention include preferably an ultraviolet ray, a visual light, and an electron beam, most preferably an ultraviolet ray and an electron beam.

In the case of using an ultraviolet ray, there is adopted a method of using a photo-radical generator (cf. examples described above) which generates a radical by an ultraviolet ray and using the ultraviolet ray as the radiation. In this case, a sensitizer may be used in combination, if necessary. The above ultraviolet ray has a wavelength of the range of usually 200 to 400 nm, and the wavelength range is preferably from 250 to 400 nm. As an apparatus for irradiating the ultraviolet ray, use can be preferably made of a known apparatus such as a high-pressure mercury lamp, a metal halide lamp, or an ultraviolet lamp having a structure which generates an ultraviolet ray by a microwave. The output of the apparatus is usually 10 to 200 W/cm and it is preferred to place the apparatus at a distance of 5 to 80 cm toward a material to be irradiated since photo degradation, heat degradation, heat deformation, and the like are little.

The composition of the invention can be also preferably cured by an electron beam and a cured product excellent in mechanical properties, especially tensile elongation property can be obtained. In the case of using an electron beam, although the source and irradiation apparatus thereof are expensive, the addition of an initiator can be omitted and no polymerization inhibition with oxygen occurs and hence degree of surface curing becomes satisfactory, so that it is preferably used in some cases.

As an electron beam-irradiating apparatus to be used for electron beam irradiation, the mode thereof is not particularly limited and a curtain type, an area beam type, a broad beam type, a pulse beam type, or the like may be mentioned. The acceleration voltage at the electron beam irradiation is preferably from 10 to 1000 kV.

With regard to the intensity of the radiation, irradiation is performed at an energy of 0.1 $J/cm^2$ or more, preferably 0.2 $J/cm^2$ or more. Moreover, irradiation is performed at the energy range of usually 20 $J/cm^2$ or less, preferably 10 $J/cm^2$ or less, further preferably 5 $J/cm^2$ or less, more preferably 3 $J/cm^2$ or less, particularly preferably 2 $J/cm^2$ or less.

The intensity of the radiation can be suitably selected depending on the kind of the radiation-curable resin composition as far as the intensity falls within the range. For example, in the case of the radiation-curable resin composition containing a monomer containing a urethane bond or a hydroxyalkylene group and/or an oligomer thereof, the irradiation intensity of the radiation is preferably 2 $J/cm^2$ or less. Moreover, in the case of the radiation-curable resin composition containing a monomer comprising a condensed alicyclic acrylate and/or an oligomer thereof, the irradiation intensity of the radiation is preferably 3 $J/cm^2$ or less.

In the case that the irradiation intensity of the radiation or an irradiation time is extraordinarily little, the thermal resistance and mechanical properties of the crosslinked resin composition are not sufficiently exhibited in some cases owing to incomplete polymerization. The irradiation time is usually 1 second or more, preferably 10 seconds or more. However, when the time is extremely excessive, degradation represented by hue deterioration by light, such as yellowing may occur in some cases. Therefore, the irradiation time is usually 3 hours or less, preferably about 1 hour or less in view of reaction acceleration and productivity.

The irradiation of the radiation may be performed at one step or at multi-steps. As the source, a diverging source from which the radiation diverges in all directions is usually used and the above polymerizable liquid composition shaped in a mold is irradiated in a fixed and standing state or in a state where it is conveyed on a conveyer with a radiation source in a fixed and standing state.

Moreover, it is also possible that the above polymerizable liquid composition is formed as a coated liquid film on a suitable substrate (e.g., a resin, a metal, a semi-conductor, glass, paper, etc.) and then the coated liquid film is cured by irradiation with a radiation.

(Radiation-Cured Product)

The radiation-cured product of the invention usually shows an insoluble and infusible property in a solvent and preferably possesses an advantageous properties for uses as optical members and excellent in adhesion and degree of surface curing even when formed as a thick film. Specifically, the product preferably shows a low optical distortion (low birefringence), a high light transmittance, dimensional stability, a high adhesion, a high degree of surface curing, and an at least certain level of thermal resistance. Moreover, the smaller shrinkage at curing is preferred.

The following will describe in more detail.

The radiation-cured product of the invention usually has a film thickness of 5 cm or less. It is preferably 1 cm or less, further preferably 1 mm or less, more preferably 500 μm or less. Moreover, the product has a film thickness of usually 1 μm or more, preferably 10 μm or more, further preferably 20 μm or more, more preferably 30 μm or more, particularly 70 μm or more, most preferably 85 μm or more.

With regard to the transparency of the above cured resin product, light transmittance at 550 nm per a light path length of 0.1 mm is preferably 80% or more, more preferably 85% or more, further preferably 89% or more. Further preferably, light transmittance at 400 nm per a light path length of 0.1 mm is preferably 80% or more, more preferably 85% or more, further preferably 89% or more. Particularly preferably, the product preferably has the above light transmittance per a light path length of 1 mm. The light transmittance is suitably measured at room temperature, for example, by an ultraviolet/visible light absorptiometer of Model HP8453 manufactured by Hewlett-Packard Co.

Furthermore, the radiation-cured product of the invention has a pencil hardness of preferably HB or higher, more preferably F or higher, further preferably H or higher in the pencil hardness test in accordance with JIS K5400. Moreover, 7H or higher is preferred. In this case, the cured product preferably satisfies the above hardness even in the cured product cured on an inorganic substrate such as an inorganic substrate such as glass or a metal or a resin substrate. Further preferably, it is preferred to satisfy the above hardness even in the cured product cured on a plastic substrate such as polycarbonate. When the hardness is too small, the surface is apt to be scratched, so that the case is not preferred. Too large hardness itself is not problematic but the cured product tends to be brittle and cracks and exfoliation are apt to occur, so that the case is not preferred.

Furthermore, the shrinkage at curing is preferably as small as possible and is usually 3% by volume or less, more preferably 2% by volume or less. Generally, it is replaced by the method of applying a radiation-curable resin composition on a substrate and measuring a concave warping amount generated after curing. The method of the measurement comprises forming a composition film having a thickness of 100±15 μm on a round polycarbonate plate having a diameter of 130 mm and a thickness of 1.2±0.2 mm, irradiating it with a prescribed amount of a radiation, and then allowing to stand it on a machine platen. After the standing, concave warping of the polycarbonate plate generated by the shrinkage by curing of the composition is measured. The concave warping is preferably 1 mm or less, further preferably 0.1 mm or less.

Furthermore, smaller thermal expansion of the radiation-cured product means better dimensional stability and is preferred. For example, a linear expansion coefficient which is a concrete index of thermal expansion is preferably as small as possible and is preferably $13 \times 10^{-5}/°$ C. or less, more preferably $12 \times 10^{-5}/°$ C. or less, further preferably $10 \times 10^{-5}/°$ C. or less, particularly preferably $8 \times 10^{-5}/°$ C. or less. The linear expansion coefficient is measured, for example, at a weight of 1 g at an elevation rate of 10° C./minute using a plate-shape specimen of 5 mm×5 mm×1 mm by compression thermomechanometry (TMA; Model SSC/5200; manufactured by Seiko Instruments) and the linear expansion coefficient is evaluated at every 10° C. in the range of 40° C. to 100° C., the average value being determined as a representative value.

In addition, adhesion is preferably as high as possible. The measuring method thereof comprises dropping the composition in an amount sufficient for the formation of a film on an optical ground glass plate 10 cm square, irradiating it with a prescribed amount of a radiation, and then allowing to stand it at room temperature for 1 hour. The evaluation can be performed by cutting the center of the cured composition part by a retractable knife so as to reach the glass surface and, after standing at room temperature for another 14 days, determining whether interface exfoliation between the cured product of the composition and the glass surface at the precut part is visually observed or not. The number of samples is 5. The case that no exfoliation is observed on all the samples is evaluated as ⊚, the case that no exfoliation is observed on two or more samples is evaluated as ○, the case that no exfoliation is observed on only one sample is evaluated as Δ, and the case that exfoliation is visually observed on all the samples is evaluated as x. Preferred as adhesion is ○ or ⊚, further preferred is ⊚.

Moreover, it is more preferred to have the above adhesion on a plastic substrate such as polycarbonate rather than on the optical ground glass plate.

In addition, the degree of surface curing is preferably hard. With regard to the measuring method thereof, the cured product after irradiation with a prescribed ultraviolet ray is lightly put between forefinger and thumb of the right hand fitted with a rubber glove so that the thumb faces the coated surface side, and then, when the thumb is released from the coated surface, the case that the finger mark is visually not observed is measured as ○, the case that the finger mark is visually observed slightly is measured as Δ, and the case that the finger mark is visually observed thickly is measured as x. As the surface hardness, ○ is preferred.

Moreover, the radiation-cured product of the invention preferably maintain the adhesion to the adherent material even after the passage of time. Specifically, the ratio of adhesion area relative to the adherent material is preferably maintained 50% or more of the initial adhesion area after a laminate obtained by forming a cured product layer having a film thickness of 100±15 μm on the adherent material is placed under the environment of 80° C. and 85% RH for 100 hours, more preferably 200 hours. The ratio is further preferably 80% or more, particularly preferably 100%. The adhesion to the adherent material can be determined by applying the radiation-curable composition of the invention on the surface of the adherent material 10 cm square and curing it to form a laminate containing a cured product layer having a film thickness of 100±15 μm, placing the laminate in a constant-temperature and constant-humidity chamber set at 80° C. and 85% RH for 100 hours, then overlaying the taken-out laminate with a transparent film ruled in 2 cm squares, counting the number of the squares where exfoliation area to the adherent material is less than half, and calculating percentage thereof relative to the total number 25, the percentage being determined as the adhesion to the adherent material.

Alternatively, it can be determined by measuring the weight of the adherent material attached with the composition film before and after the constant-temperature and constant-humidity test.

The adherent material is not particularly limited and includes resins, glass, ceramics, inorganic crystals, metals, semi-conductors, diamond, organic crystals, paper pulp, wood, and the like. Preferably, it is a plastic substrate such as polycarbonate or a substrate obtainable by laminating an organic substance or an inorganic substance on the plastic substrate.

Moreover, with regard to the thermal resistance, a glass transition temperature measured by Differential Scanning Calorimetry (DSC), Thermal Mechanical Analysis (TMA) or dynamic viscoelasticity measurement is preferably 120° C. or higher, more preferably 150° C. or higher, further preferably 170° C. or higher.

Moreover, the cured resin product of the invention is preferably not soluble in various solvents. Representatively, it is preferably not soluble in solvents such as toluene, chloroform, acetone, and tetrahydrofuran.

The cured resin product of the invention contains inorganic substance ultrafine particles such as silica particles. Since the fine particles are substance having optical properties different from those of the resin matrix which is an organic substance, the cured resin product as a whole may sometimes have a characteristic of a peculiar balance between refractive index and Abbe number which cannot be realized by a sole organic substance. Such peculiar balance between refractive index and Abbe number is useful in the uses where refraction of light is utilized and small birefringence is desired, such as lenses and prisms in some cases. Specifically, it is the case that the constant term C in the following mathematical expression which represents the relation between the refractive index $n_D$ and the Abbe number $v_D$ measured at the wavelength of sodium D line at 23° C. deviates from the range of 1.70 to 1.82.

$$n_D = 0.005 v_D + D \qquad \text{Mathematical expression 1}$$

In a molded article of a resin material, generally, as thickness increases, birefringence also becomes large. In the invention, by using the above silica particles, the cured resin product of the invention acquires a characteristic that an increasing rate of birefringence becomes unprecedentedly small as compared with the increase in thickness in some cases. Therefore, as the optical members of the invention to be mentioned below, in the case that the cured resin product of the invention is used as a relatively thick molded article having a thickness of 0.1 mm or more, it is advantageous in view of low birefringence.

Since the radiation-cured product of the invention has a little optical distortion represented by birefringence, has a good transparency, and also has functional properties such as excellent dimensional stability and surface hardness, it is excellent as optical materials.

The optical materials herein refers to general molded articles to be used in the uses utilizing the optical properties of the material composing the same, e.g., transparency, absorption/emission properties, difference in refraction index from outside world, small birefringence, the above peculiar balance between refractive index and Abbe number, and the like. Specific examples include members for optics and optoelectronics such as display panels, tough panels, lenses, prisms, wave guides, and light amplifiers.

The optical materials of the invention are roughly classified into two kinds of groups. The first optical materials are optical materials which are molded articles of the above cured resin product and the second optical material are optical materials which are molded articles having a thin layer of the above cured resin product as a partial layer. That is, the former are optical materials containing mainly the above cured resin product in addition to any thin film (coat layer) which is other than the cured resin product. On the other hand, the latter are optical materials mainly composed of a material which is not necessarily the above cured resin product and having a thin film of the cured resin product as a partial layer. Every optical material may be one molded closely adhered to any solid material substrate such as a resin, glass, a ceramic, an inorganic solid, a metal, a semi-conductor, diamond, an organic crystal, paper pulp, or wood.

The dimension of the above first optical materials is not limited but the lower limit value of the light path length of the part of the cured resin product is usually 0.01 mm, preferably 0.1 mm, further preferably 0.2 mm in view of mechanical strength of the optical materials. On the other hand, the upper limit value is usually 10,000 mm, preferably 5,000 mm, further preferably 1,000 mm in view of attenuation of light intensity.

The shape of the above first optical materials is not limited and examples thereof include tabular, curved, lens-like (concave lens, convex lens, concavoconvex lens, one-sided concave lens, one-sided convex lens, etc.), prism-like, fibrous, and the like shapes.

The dimension of the above second optical materials is not limited but the lower limit value of the film thickness of the cured resin product film is usually 0.05 μm, preferably 0.1 μm, further preferably 0.5 μm in view of mechanical strength and optical properties. On the other hand, the upper limit value of the film thickness is usually 3,000 mm, preferably 2,000 mm, further preferably 1,000 mm in view of moldability of the thin film and the balance between cost and performance.

The shape of such a thin film is not limited and the shape is not necessarily a tabular shape and the film may be formed on a substrate having any shape such as a spherical, aspheric curved, cylindrical, conical, or bottle-like shape, for example.

The optical material of the invention may be a multi-layered structure by providing any cover layers such as a protective layer which prevents mechanical damage of an applied surface by attrition and wear, a light absorbing layer which absorbs light having an undesirable wavelength causing deterioration of semi-conductor crystal particles, substrates, and the like, a permeation shielding layer which suppresses or prevents permeation of reactive low-molecular-weight molecules such as moisture and oxygen gas, an antidazzle layer, an anti-reflecting layer, and a layer of low refractive index, as well as any additional functional layers such as an underlying layer which improves adhesiveness between a substrate and an applied surface, and an electrode layer. Specific examples of such any cover layers include transparent conductive films and gas barrier films composed of an inorganic oxide-coating layer, gas barrier films and hard coats composed of an organic oxide-coating layer, and the like. As a coating method thereof, use can be made of a known coating method such as a vacuum deposition method, a CVD method, a sputtering method, a dip coating method, or a spin-coating method.

When further described in detailed, specific examples of the optical materials of the invention include various lenses such as spectacle lenses, micro-lenses for light connector, and condensers for light-emitting diode; parts for optical communication such as optical switches, optical fibers, optical branches in optical circuits, junction circuits, photo multi-way branching circuits, and luminous-intensity controllers; members for various displays, such as liquid crystal substrates, touch panels, light guide plates, phase-difference plates; memory and recording uses including optical disk substrates and film coating for photo disks, various materials for optical communication, such as optical adhesives; various optical film-coating uses such as functional films, anti-reflecting films, optical multi-layered films (selective reflecting films, selective transmission films, etc.), superresolution films, ultraviolet-absorbing films, reflection-controlling films, light guides, and discrimination function-printed surfaces; and the like.

(Optical Recording Medium)

The optical recording medium used in the invention is not particularly limited but a next-generation high-density optical recording medium preferably using a blue laser is preferred. The optical recording medium means an optical recording medium obtainable by forming a protective film on a surface where a dielectric film, a recording film, a reflecting film, and the like (hereinafter, these layers are generically referred to as a recording-retrieving function layer) are formed on a substrate, wherein a laser light having a wavelength of 380 to 800 nm, preferably a wavelength of 450 to 350 nm is used.

The following will describe the substrate. On one main surface of the substrate, convexoconcave grooves for recording and retrieving optical information are provided and are formed by injection molding of an optically transparent resin using a stamper. The material for the substrate is not particularly limited. For example, thermoplastic resins including polycarbonate resin, polymethacrylate resin, and polyolefin resin, and glass can be used. Among them, polycarbonate resin is most preferable because it is most widely used in CD-ROMs and the like and inexpensive. The thickness of the substrate is generally 0.1 mm or more, preferably 0.3 mm or more, more preferably 0.5 mm or more; and 20 mm or less, preferably 15 mm or less, more preferably 3 mm or less. In general, the thickness of the substrate is set to approximately 1.2+±0.2 mm. The outer diameter of the substrate is generally approximately 130 mm.

The recording-retrieving function layer is a layer configured to exert a function capable of recording and retrieving information signals or retrieving information signals, and may include a single layer or a plurality of layers. Layer configurations of the recording-retrieving function layer can be selected according to a type of the recording medium, such as the optical recording medium is a read-only medium (ROM medium), a write once medium in which recording is allowed only once (Write Once medium), or a rewritable medium in which recording and erasing can be repeatedly performed (Rewritable medium).

For example, in a read-only medium, the recording-retrieving function layer generally includes a single layer containing metal such as Al, Ag, or Au. For example, the recording-retrieving function layer is formed by depositing an Al, Ag, or Au reflecting layer on the substrate by sputtering.

In a write once medium, the recording-retrieving function layer is generally formed by providing a reflecting layer containing metal, such as Al, Ag, or Au, and a recording layer containing an organic dye material in this order on the substrate. As such a write once medium, there may be mentioned one obtainable by forming a reflecting layer by sputtering and then forming an organic dye material layer ion a substrate by spin coating. As another specific example of a write once medium, there may be also mentioned one wherein a recording-retrieving function layer is formed by providing a reflecting layer containing a metal, such as Al, Ag, or Au, a dielectric layer, a recording layer, and a dielectric layer in this order on a substrate and the dielectric layers and the recording layer contain an inorganic material. In such a write once medium, the reflecting layer, the dielectric layer, the recording layer, and the dielectric layer are generally formed by sputtering.

In a rewritable medium, the recording-retrieving function layer is generally formed by providing a reflecting layer containing a metal, such as Al, Ag, or Au, a dielectric layer, a recording layer, and a dielectric layer in this order on a substrate. The dielectric layers and recording layer generally contain an inorganic material. In such a rewritable medium, the reflecting layer, the dielectric layers, the recording layer, and the dielectric layer are generally formed by sputtering. Other specific examples of rewritable media include a magneto-optical recording medium. Incidentally, a recording and retrieving area is set in the recording-retrieving function layer. The recording and retrieving area is generally provided in a region having an inner diameter larger than that of the recording-retrieving function layer and an outer diameter smaller than that of the recording-retrieving function layer.

FIG. 1 is a diagram for explaining one example of the recording-retrieving function layer 5 in the optical recording medium 10 of a rewritable type. The recording-retrieving function layer 5 is composed of a reflecting layer 51 which is provided directly on the substrate 1 and which is formed of a metal material, a recording layer 53 formed of a phase change-type material, two dielectric layers 52 and 54 provided to hold the recording layer 53 therebetween from above and below.

The material used for the reflecting layer 51 is preferably a material having a large reflectivity. In particular, a metal, such as Au, Ag, or Al, whose heat dissipating effect can be expected, is preferred. Further, in order to control the heat conductivity of the reflecting layer itself and improve the resistance to corrosion thereof, a small amount of metal, such as Ta, Ti, Cr, Mo, Mg, V, Nb, Zr, or Si, may be added thereto. The amount of the metal added thereto in a small amount is generally 0.01% atom or more and 20% atm or less. Among the above, aluminum alloys containing Ta and/or Ti at 15% atm or less, particularly the alloys $Al_\alpha Ta_{1-\alpha}$ ($0 \leq \alpha \leq 0.15$), are excellent in resistance to corrosion, and particularly preferable materials for the reflecting layer in terms of the improvement of reliability of the optical recording medium. Moreover, Ag alloy containing any one of Mg, Ti, Au, Cu, Pd, Pt, Zn, Cr, Si, Ge, a rare-earth element at 0.01% atm or more and 10% atm or less in addition to Ag is preferable because of the high reflectivity, the high heat conductivity, and the excellent heat resistance thereof.

The thickness of the reflecting layer 51 is generally 40 nm or more, preferably 50 nm or more; and generally 300 nm or less, preferably 200 nm or less. When the thickness of the reflecting layer 51 is excessively large, the shape of a groove for tracking which is formed in the substrate 1 tends to change. Further, it takes a long time for deposition and material cost tends to increase. When the thickness of the reflecting layer 51 is excessively small, the reflecting layer 51 may not function as a reflecting layer because light transmission occurs and also, an island structure which is formed in the early stage of deposition is prone to affect on part of the reflecting layer 51, and the reflectivity and the heat conductivity may be reduced.

The material used for the two dielectric layers 52 and 54 is used to prevent the evaporation and deformation of the recording layer 53 which occurs in case of phase change of the recording layer 53 and to control thermal diffusion at the same time. The material for the dielectric layers is determined in consideration of refractive index, heat conductivity, chemical stability, mechanical strength, adhesion, and the like. In general, highly transparent and high-melting-point dielectric materials such an oxide, sulfide, nitride, or carbide of metal or semiconductor, or a fluoride of Ca, Mg, Li, or the like, can be used. Such an oxide, sulfide, nitride, carbide, or fluoride may not necessarily take a stoichiometric composition. Controlling the composition and using the above-described materials in a mixed state for the control of a refractive index and the like are also effective.

Specific examples of such dielectric materials include, for example, oxides of metals, such as Sc, Y, Ce, La, Ti, Zr, Hf, V, Nb, Ta, Zn, Al, Cr, In, Si, Ge, Sn, Sb, and Te; nitrides of metals, such as Ti, Zr, Hf, V, Nb, Ta, Cr, Mo, W, Zn, B, Al, Ga, In, Si, Ge, Sn, Sb, and Pb; carbides of metals, such as Ti, Zr, Hf, V, Nb, Ta, Cr, Mo, W, Zn, B, Al, Ga, In, and Si; and mixtures thereof. Moreover, sulfides of metals, such as Zn, Y, Cd, Ga, In, Si, Ge, Sn, Pb, Sb, and Bi; selenides or tellurides; fluorides of Mg, Ca, and the like; and mixtures thereof can be also included therein.

Considering re-writing properties, a mixture of dielectric materials is preferable. For example, a mixture of chalcogenide compound, such as ZnS or rare-earth sulfide, and a heat resistant compound, such as oxide, nitride, carbide, or fluoride, can be mentioned. For example, a mixture containing ZnS as the main component and a heat resistant compound, and a mixture containing rare-earth sulfate, particularly $Y_2O_2S$, as the main component and a heat resistant compound, are preferable examples of the composition of a dielectric layer. More specifically, $ZnS—SiO_2$, SiN, $SiO_2$, $TiO_2$, CrN, $TaS_2$, $Y_2O_2S$, and the like can be mentioned. Among these materials, $ZnS—SiO_2$ is widely used, as the film forming rate is high, the film stress is small, the volume change due to a temperature change is small, and it has excellent weather resistance.

The thickness of the dielectric layer 52 or 54 is generally 1 nm or more and 500 nm or less. By setting the thickness to 1 nm or more, the effect of preventing the deformation of the substrate and the recording layer can be sufficiently ensured, and the dielectric layer 52 or 54 can sufficiently act as a dielectric layer. Moreover, by setting the thickness to 500 nm or less, it is possible to prevent the occurrence of a crack which is considered to be caused by the internal stress of the dielectric layer itself and by the significant difference in elastic properties between the dielectric layer and the substrate.

As material used to form the recording layer 53, for example, compounds having the compositions GeSbTe, InSbTe, AgSbTe, AgInSbTe, and the like can be mentioned. Among these, a thin film having $\{(Sb_2Te_3)_{1-x}(GeTe)_x\}_{1-y}Sb_y$ ($0.2 \leq x \leq 0.9$, $0 \leq y \leq 0.1$) alloy or $(Sb_xTe_{1-x})_yM_{1-y}$ ($0.6 \leq x \leq 0.9$, $0.7 \leq y \leq 1$, M is at least one selected from Ge, Ag, In, Ga, Zn, Sn, Si, Cu, Au, Pd, Pt, Pb, Cr, Co, O, S, Se, V, Nb, Ta) alloy as the main component, is stable in both crystal and amorphous states, and allows fast phase transition between both states. In addition, these materials have an advantage that segregation hardly occurs when overwrite is repeatedly performed, and are therefore most practical materials.

The film thickness of the recording layer 53 is generally 5 nm or more, preferably 10 nm or more. Within this range, sufficient optical contrast between the amorphous and crystal states can be obtained. Furthermore, the film thickness of the recording layer 53 is usually 30 nm or less, preferably 20 nm or less. Within this range, it is possible to obtain an increase in optical contrast due to the fact that light having passed through the recording layer 53 is reflected by the reflecting layer, and fast recording can also be performed because heat capacity can be adjusted to an appropriate value. In particular, when the film thickness of the recording layer 53 is set to 10 nm or more and 20 nm or less, faster recording and higher optical contrast can be mutually compatible. Volume change associated with phase change is reduced by setting the thickness of the recording layer 53 within such a range, thus it is made possible to reduce the influence of volume change repeatedly caused by overwriting, the influence being exerted on the recording layer 53 itself and other layers which are in contact with the top and bottom of the recording layer 53. Furthermore, the accumulation of irreversible microscopic deformation of the recording layer 53 is suppressed, noise is reduced, and overwriting durability is improved.

The reflecting layer 51, the recording layer 53, and the dielectric layers 52 and 54 are generally formed by sputtering or the like. It is desirable, in terms of the prevention of oxidation and contamination between each layer, to perform film deposition by using in-line equipment in which a target for the recording layer, a target for the dielectric layers, and, if necessary, a target for the reflecting layer, are installed in the vacuum chamber thereof. Moreover, it is also excellent in terms of productivity.

The protective layer 3 is composed of a cured product obtainable by spin-coating the above radiation-curable resin composition and curing it, and the layer is provided being in contact with the recording-retrieving function layer 5 and has a plane ring shape. The protective layer 3 is formed of a material which allows a laser light used for recording and retrieving to pass therethrough. The transmittance of the protective layer 3 usually needs to be 80% or more, preferably 85% or more, more preferably 89% or more, at the wavelength of light used for recording and retrieving. Within such a range, loss due to the absorption of light used for recording and retrieving can be minimized. On the other hand, it is most preferable that the transmittance becomes 100%, but the transmittance generally becomes 99% or less because of the performance of a material to be used.

Such a photo-curable resin is sufficiently transparent to a blue laser light having a wavelength near 405 nm which is used for the recording and retrieving of an optical disk. Furthermore, it is desirable that the curable resin has the property of protecting the recording function layer 53 formed on the substrate 1 from water and dust.

In addition, the surface hardness of the protective film 3 has a pencil hardness of preferably HB or higher, more preferably F or higher, further preferably H or higher in the pencil hardness test in accordance with JIS K5400. Moreover, 7H or higher is preferred. When the hardness is too small, the surface is apt to be scratched, so that the case is not preferred. Too large hardness itself is not problematic but the cured product tends to be brittle and cracks and exfoliation are apt to occur, so that the case is not preferred.

Furthermore, adhesion between the protective layer 3 and the recoding retrieving function layer 5 is preferably as high as possible. Moreover, the adhesion durability is also preferably as high as possible. It is preferably retained that the ratio of adhesion area of the protective layer 3 and the recoding retrieving function layer 5 is 50% or more of the initial adhesion area after placed under the environment of 80° C. and 85% RH for 100 hours, more preferably 200 hours. The ratio is further preferably 80% or more, particularly preferably 100%.

The film thickness of the protective layer 3 is usually 10 μm or more, preferably 20 μm or more, more preferably 30 μm or more, further preferably 70 μm or more, particularly preferably 85 μm or more. When the film thickness is within such a range, the influence of dust and scratches attached on the surface of the protective layer can be reduced and the thickness is sufficient to protect the recoding retrieving function layer 5 from the moisture of surrounding atmosphere and the like. On the other hand, the film thickness is usually 300 μm or less, preferably 130 μm or less, more preferably 115 μm or less. When the film thickness is within such a range, an even film thickness can be easily formed by a general coating method used in a spin coating or the like. The protective layer is preferably formed in an even film thickness over the range covering the recoding retrieving function layer 5.

The optical recording medium obtained as described above may be used as a single plate or as a laminate of two or more of them. The medium may be provided with a hub according to need and may be incorporated into a cartridge.

EXAMPLES

The following will describe Examples of the invention. However, the invention is not limited to these Examples unless it exceeds the scope of the gist thereof.

(Evaluation Methods)
(1) Viscosity: it was measured at 25° C. by means of E-type viscosimeter or a vibration-type viscosimeter.
(2) Surface tension: it was measured at 25° C. by means of an automatic surface tensiometer (CBVP-A3 Model; manufactured by Kyowa Interface Science Co., Ltd.). As a plate for evaluation, a platinum plate was used.
(3) Coating-spreading property: 2 g of a composition was dropped onto a round polycarbonate plate having a diameter of 130 mm and a thickness of 1.2 mm and sputtered with silicon nitride (hereinafter referred to as substrate) to effect spin-coating. At that time, the case that any uncoated part or flicking was present was evaluated as ◯, and the case that an uncoated part or flicking was present was evaluated as x.
(4) Remaining solvent: it was judged whether solvent odor (alcohol odor) was observed or not. The case that solvent odor was observed was evaluated as x and the case that solvent odor was not observed was evaluated as ◯.
(5) Transmission electron microscope (TEM) observation: the observation was performed on a Model H-9000UHR transmission electron microscope (acceleration voltage 300 kV, degree of vacuum at observation about $7.6 \times 10^{-9}$ Torr) manufactured by Hitachi, Ltd.
(6) Light transmittance: it was measured at room temperature on a Model HP8453 ultraviolet/visible light absorptiometer manufactured by Hewlett-Packard Co. The transmittance per a light path length of 1 mm at a wavelength of 550 nm was used as a representative value. In present Examples, the transmittance per a light path length of 1 mm was measured but the Examples can be considered as Reference Examples of a light path length of 0.1 mm.
(7) Surface hardness: it was measured by a pencil hardness test in accordance with JIS K5400.
(8) Degree of surface curing: after irradiated with a prescribed amount of ultraviolet ray, the sample was lightly put between forefinger and thumb of the right hand fitted with a rubber glove so that the thumb faces the coated surface side, and then, when the thumb was released from the coated surface, the case that the finger mark was visually not observed was measured as ◯, the case that the finger mark was visually observed slightly was measured as Δ, and the case that the finger mark was visually observed thickly was measured as x.
(9) Shrinkage at curing: a composition film having a thickness of 100±15 μm was formed on a round polycarbonate plate having a diameter of 130 mm and a thickness of 1.2 mm using a spin coater, it was irradiated with an ultraviolet ray for 30 seconds by means of a high-pressure mercury lamp having an output of 80 W/cm placed on a position at a distance of 15 cm from the composition film (irradiation intensity 1 J/cm$^2$), and then it was allowed to stand on a machine platen for 1 hour. After the standing, concave warping of the polycarbonate plate generated by shrinkage at curing of the composition was measured.
(10) Adhesion: 15 drops of the composition were dropped onto an optical ground glass plate 10 cm square using a dropper, it was allowed to stand at room temperature for 1 minute, it was then irradiated with an ultraviolet ray for 5 minute between metal halide lamps having an output of 80 W/cm placed above and under it at a distance of 40 cm (irradiation intensity 1.5 J/cm$^2$) to cure the composition, and then it was allowed to stand at room temperature for 1 hour. The evaluation was performed by cutting the center of the cured composition part by a retractable knife so as to reach the glass surface and, after allowed to stand at room temperature for another 14 days, determining whether interface exfoliation between the cured product of the composition and the glass surface at the precut part was visually observed or not.

The number of samples was 5. The case that no exfoliation was observed on all the samples was evaluated as ⊚, the case that no exfoliation was observed on two or more samples was evaluated as ◯, the case that no exfoliation was observed on only one sample was evaluated as Δ, and the case that exfoliation was visually observed on all the samples was evaluated as x.
(11) Adhesion Durability A: an adherent material made of polycarbonate having 10 cm square was coated with a radiation-curable composition and the resulting composition film was irradiated with an ultraviolet ray for 30 seconds by means of a high-pressure mercury lamp having an output of 80 W/cm placed on a position at a distance of 15 cm from the composition film (irradiation intensity 1 J/cm$^2$) and cured to form a laminate having a cured product layer of a film thickness of 100±15 μm. The laminate was placed in a constant-temperature and constant-humidity chamber set at 80° C. and 85% RH for 100 hours, and then the taken-out laminate was overlaid with a transparent film ruled in 2 cm squares.

The number of the squares where exfoliation area to the adherent material was less than half was counted and percentage thereof relative to the total number 25 was calculated, the percentage being determined as the adhesion to the adherent material.
(12) Adhesion Durability B: As an adherent material having a structure closer to the structure wherein a protective layer was formed on an actual optical recording medium, a substrate with a silicon nitride film was used which was obtained by sputtering silicon nitride on a round polycarbonate plate having a diameter of 130 mm and a thickness of 1.2 mm. After the weight was measured (Ma [g]), a radiation-cured resin composition film having a thickness of 100±15 μm was formed using a spin coater, the film was irradiated with an ultraviolet ray for 30 seconds by means of a high-pressure mercury lamp having an output of 80 W/cm placed on a position at a distance of 15 cm from the composition film (irradiation intensity 1 J/cm$^2$), and then it was allowed to stand on a machine platen for 1 hour.

After standing, the weight of the substrate with a silicon nitride film to which the composition film was attached was measured (Mb [g]). It was stored in a constant-temperature and constant-humidity chamber set at 80° C./85% RH for 200 hours and then allowed to stand at room temperature (25° C.) for 3 days. Thereafter, the weight of substrate with a silicon nitride film to which the composition film was attached was measured (Mc [g]) and the adhesion area was calculated according to the following equation.

Adhesion are [%]=(Mc−Ma)÷(Mb−Ma)×100

However, less than 10% was round off.
(13) Linear expansion coefficient: it was measured at a weight of 1 g at an elevation rate of 10° C./minute using a plate-shape specimen of 5 mm×5 mm×1 mm by compression thermomechanometry (TMA; Model SSC/5200; manufactured by Seiko Instruments). The linear expansion coefficient was evaluated at every 10° C. in the range of 40° C. to 100° C., the average value being determined as a representative value.

Example 1

[a] Preparation of Tetramethoxysilane Oligomer

After 234 g of tetramethoxysilane and 74 g of methanol were mixed, 22.2 g of 0.05% hydrochloric acid was added thereto and hydrolysis was carried out at 65° C. for 2 hours. Then, the temperature in the system was elevated to 130° C. After removal of the methanol formed, the temperature was gradually elevated to 150° C. under passing methanol through and was maintained for 3 hours to remove the tetramethoxysilane monomer.

[b] Preparation of a Silica Particle

To 30.8 g of the tetramethoxysilane oligomer obtained by the above operations was added 62.4 g of methanol. After stirring, 0.31 g of acetylacetone aluminum as a catalyst was dissolved in the homogeneous solution. To the solution was gradually added 6.5 g of desalted water dropwise and the whole was stirred at 60° C. for 2 hours to grow a silica particle. The diameter of the silica particle formed was estimated to be 2 to 5 nm by a morphology observation using a TEM electron microscope.

[c] Hydrophobic Treatment of Surface of the Silica Particle with Silane Coupling Agent To 40 g of an alcohol solution of the silica particle obtained by the above operations was added 10 g of acryloxypropyltrimethoxysilane as a silane coupling agent, and the whole was stirred at room temperature for 2 hours to react the surface of the silica particle with the silane coupling agent, whereby 50 g of a solution of silane-treated silica particle was obtained.

[d] Synthesis of Urethane Acrylate Oligomer

In a four-neck flask were placed 222.3 g of isophoronee diisocyanate and 60 mg of dibutyltin laurate, and the whole was heated at 70 to 80° C. on an oil bath and gently stirred until the temperature became constant. When the temperature reached a constant value, a mixture of 27 g of 1,4-butanediol and 165.4 g of polytetramethylene glycol was added dropwise through a dropping funnel, followed by 2 hours of stirring while the temperature was maintained at 80° C. After the temperature was lowered to 70° C., a mixture of 143 g of hydroxyethyl acrylate and 0.3 g of methoquinone was added dropwise through a dropping funnel and, after the dropwise addition, the whole was stirred for 10 hours with maintaining the temperature at 80° C. to synthesize a urethane acrylate oligomer.

To the urethane acrylate oligomer was added 186 g of acryloylmorpholine to effect dilution, whereby urethane resin composition A was formed.

[e] Mixing of Resin Monomer Containing Radiation-Polymerizable Functional Group and Removal of Solvent To the above solution of silane-treated silica particle were added 38.3 g of the urethane resin composition A and 2.7 g of 1-hydroxycyclohexyl phenyl ketone as a photo radical generator and the whole was stirred at room temperature for 2 hours to obtain a transparent curable resin composition.

Low-boiling-point components contained in the radiation-curable resin composition were removed by evaporation at 60° C. for 1 hour under reduced pressure.

The viscosity, surface tension, coating-spreading property, and remaining solvent of the resulting radiation-curable resin composition were measured. The results are shown in Table 1.

[f] Curing and Molding of Radiation-Curable Resin Composition

It was poured into an optical ground glass mold in which walls were formed by combining four silicone sheets having a thickness of 1 mm cut into a width of 1 cm and was irradiated with an ultraviolet ray for 30 seconds by means of a high-pressure mercury lamp having an output of 80 W/cm placed on a position at a distance of 15 cm from the liquid surface (irradiation intensity 1 J/cm$^2$). After the irradiation with an ultraviolet ray, the irradiated product was removed from the glass mold and heated at 80° C. for 1 hour to obtain a cured product having a film thickness of 1 mm. The light transmittance, surface hardness, degree of surface curing, and particle size of the silica particles were evaluated on the cured product. Moreover, shrinkage at curing, adhesion, adhesion durability A and B, and linear expansion coefficient were evaluated. Various physical properties of the cured resin product are shown in Table 2.

The product showed properties of high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 2

A cured resin product was obtained in the same manner as in Example 1 except that 280 g of bis(isocyanatocyclohexyl) methane was used instead of 222.3 g of isophoronee diisocyanate in the [d] step. Various physical properties of the composition and the cured resin product are shown in Tables 1 and 2. The product showed properties of high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 3

A cured resin product was obtained in the same manner as in Example 1 except that 186 g of tetrahydrofurfuryl (meth) acrylate was used instead of 186 g of acryloylmorpholine in the [d] step. Various physical properties of the composition and the cured resin product are shown in Tables 1 and 2. The product showed properties of high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 4

A cured resin product was obtained in the same manner as in Example 1 except that an electron beam was applied at 2.9 J/cm$^2$ using an electron beam-irradiating apparatus (manufactured by Iwasaki Denki K.K.; Model CB150/15/10L) instead of ultraviolet irradiation by the high-pressure mercury lamp in the [f] step. Various physical properties of the composition and the cured resin product are shown in Tables 1 and 2.

The product showed properties of high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 5

A resin composition was obtained in the same manner as in Example 1 except that 38.3 g of bis(hydroxymethyl)tricyclo [5.2.1.0$^{2,6}$]decane=diacrylate was used as a resin monomer containing no urethane bond instead of 38.3 g of the urethane resin composition A without performing the [d] step. Furthermore, a cured product is obtained in the same manner as in Example except that the ultraviolet irradiation time was changed into 1 minute in the [f] step. Moreover, curing was conducted at an irradiation energy of 2 J/cm$^2$ at the time when shrinkage at curing, adhesion, adhesion durability A and B, and linear expansion coefficient were measured. Various physical properties of the composition and the cured resin product are shown in Tables 1 and 2.

The product showed properties of low light transmission, shrinkage at curing, and linear expansion coefficient, and an excellent adhesion. The cured resin product was substantially insoluble in any solvent of toluene, chloroform, acetone, and tetrahydrofuran when it was attempted to dissolve therein.

Example 6

A cured resin product was obtained in the same manner as in Example 1 except that the amount of the alcohol solution of the silica particle was changed to 35.7 g, the amount of the acryloxypropyltrimethoxysilane was changed to 14.3 g, and the reaction temperature with the silane coupling agent was changed to 60° C. in the [c] step to obtain a transparent curable resin composition in the [e] step, and low-boiling-point components contained in the curable composition was removed by evaporation at 30° C. for 2 hours under reduced pressure after the addition of 2 g of acryloylmorpholine and 0.2 g of an additive KF351A (manufactured by Shin-Etsu Chemical Co., Ltd.). Various physical properties of the composition and the cured resin product are shown in Tables 1 and 2.

The product showed properties of a good coating-spreading property, high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 7

A cured resin product was obtained in the same manner as in Example 2 except that the amount of the alcohol solution of the silica particle was changed to 35.7 g, the amount of the acryloxypropyltrimethoxysilane was changed to 14.3 g, and the reaction temperature with the silane coupling agent was changed to 60° C. in the [c] step to obtain a transparent curable resin composition in the [e] step, and low-boiling-point components contained in the curable composition was removed by evaporation at 30° C. for 2 hours under reduced pressure after the addition of 2 g of acryloylmorpholine and 0.2 g of an additive KF351A (manufactured by Shin-Etsu Chemical Co., Ltd.). Various physical properties of the composition and the cured resin product are shown in Tables 1 and 2.

The product showed properties of a good coating-spreading property, high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 8

A cured resin product was obtained in the same manner as in Example 3 except that the amount of the alcohol solution of the silica particle was changed to 35.7 g, the amount of the acryloxypropyltrimethoxysilane was changed to 14.3 g, and the reaction temperature with the silane coupling agent was changed to 60° C. in the [c] step to obtain a transparent curable resin composition in the [e] step, and low-boiling-point components contained in the curable composition was removed by evaporation at 30° C. for 2 hours under reduced pressure after the addition of 2 g of acryloylmorpholine and 0.2 g of an additive KF351A (manufactured by Shin-Etsu Chemical Co., Ltd.). Various physical properties of the composition and the cured resin product are shown in Tables 1 and 2.

The product showed properties of a good coating-spreading property, high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 9

A cured resin product was obtained in the same manner as in Example 4 except that the amount of the alcohol solution of the silica particle was changed to 35.7 g, the amount of the acryloxypropyltrimethoxysilane was changed to 14.3 g, and the reaction temperature with the silane coupling agent was changed to 60° C. in the [c] step to obtain a transparent curable resin composition in the [e] step, and low-boiling-point components contained in the curable composition was removed by evaporation at 30° C. for 2 hours under reduced pressure after the addition of 2 g of acryloylmorpholine and 0.2 g of an additive KF351A (manufactured by Shin-Etsu Chemical Co., Ltd.). Various physical properties of the composition and the cured resin product are shown in Tables 1 and 2. The product showed properties of a good coating-spreading property, high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 10

A cured resin product was obtained in the same manner as in Example 1 except that the amount of the alcohol solution of the silica particle was changed to 35.7 g, the amount of the acryloxypropyltrimethoxysilane was changed to 14.3 g, and the reaction temperature with the silane coupling agent was changed to 60° C. in the [c] step to obtain a transparent curable resin composition in the [e] step, and low-boiling-point components contained in the curable composition was removed by evaporation at 30° C. for 2 hours under reduced pressure after the addition of 2 g of acryloylmorpholine and 0.2 g of an additive Polyflow KL510 (manufactured by Kyoeisha Chemical Co., Ltd.). Various physical properties of the composition and the cured resin product are shown in Tables 1 and 2.

The product showed properties of a good coating-spreading property, high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 11

A cured resin product was obtained in the same manner as in Example 1 except that the amount of the alcohol solution of the silica particle was changed to 35.7 g, the amount of the acryloxypropyltrimethoxysilane was changed to 14.3 g, and the reaction temperature with the silane coupling agent was changed to 60° C. in the [c] step, 34.5 g of epoxyacrylate NK oligo EA-1020 (Shin-Nakamura Chemical co., Ltd.) and 3.8 g of bis(hydroxymethyl)tricyclo[$5.2.1.0^{2,6}$]decane=diacrylate are used instead of the urethane resin composition A in the [e] step, and low-boiling-point components contained in the curable composition was removed by evaporation at 30° C. for 2 hours under reduced pressure after the addition of 2 g of acryloylmorpholine and 0.2 g of an additive KF351A (manufactured by Shin-Etsu Chemical Co., Ltd.). Various physical properties of the composition and the cured resin product are shown in Tables 1 and 2.

The product showed properties of a good coating-spreading property, high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 12

A cured resin product was obtained in the same manner as in Example 1 except that the amount of the alcohol solution of the silica particle was changed to 35.7 g, the amount of the acryloxypropyltrimethoxysilane was changed to 14.3 g, and the reaction temperature with the silane coupling agent was changed to 60° C. in the [c] step, 34.5 g of epoxyacrylate NK oligo EA-1026 (Shin-Nakamura Chemical co., Ltd.) and 3.8 g of bis(hydroxymethyl)tricyclo[$5.2.1.0^{2,6}$]decane=diacrylate are used instead of the urethane resin composition A in the [e] step, and low-boiling-point components contained in the curable composition was removed by evaporation at 30° C. for 2 hours under reduced pressure after the addition of 2 g of acryloylmorpholine and 0.2 g of an additive KF351A (manufactured by Shin-Etsu Chemical Co., Ltd.). Various physical properties of the composition and the cured resin product are shown in Tables 1 and 2.

The product showed properties of a good coating-spreading property, high light transmission and surface hardness, low shrinkage at curing and linear expansion coefficient, and excellent degree of surface curing and adhesion. The cured resin product was substantially insoluble in any solvent of toluene, chloroform, acetone, and tetrahydrofuran when it was attempted to dissolve therein.

Example 13

A carboxyl group-containing urethane acrylate oligomer (150 g) was obtained in the same manner as in Example 1 except that the reaction temperature with the silane coupling agent was changed to 60° C. in the [c] step, and the amount of the isophorone diisocyanate was changed to 60.8 g, the amount of the dibutyltin dilaurate was changed to 10 mg, dimethylolbutanoic acid instead of 1,4-butanediol was used in an amount of 12.2 g, the amount of the polytetramethylene ether glycol was changed to 45.3 g, the temperature is changed to 70° C., the amount of the hydroxyethyl acrylate was changed to 31.8 g, the amount of the methoquinone was changed to 0.1 g, and the stirring time was changed to 15 hours in the [e] step. The carboxyl group-containing urethane acrylate oligomer contained 30% by weight of constitution derived from the polytetramethylene ether glycol. Furthermore, 50 g of the carboxyl group-containing urethane acrylate oligomer and 50 g of acryloylmorpholine were added to form a curable composition.

Subsequently, a curable resin composition and a cured product thereof were obtained by performing the [e] and [f] steps in the same manner as in Example 1 except that the low-boiling-point component-removing temperature was changed to 30° C. in the [e] step. The content of the carboxyl group in the curable resin composition was $4.11 \times 10^{-4}$ eq/g. Various physical properties of the composition and the cured resin product are shown in Tables 1 and 2. The product showed properties of high light transmission and surface hardness, low shrinkage at curing and linear expansion coefficient, and excellent degree of surface curing and adhesion. Furthermore, adhesion durability was also good. The cured resin product was substantially insoluble in any solvent of toluene, chloroform, acetone, and tetrahydrofuran when it was attempted to dissolve therein.

Example 14

A carboxyl group-containing urethane acrylate oligomer (150 g) was obtained in the same manner as in Example 13 except that the amount of the isophorone diisocyanate was changed to 54.1 g, the amount of dimethylolbutanoic acid was changed to 7.2 g, the amount of the polytetramethylene ether glycol was changed to 60.4 g, and the amount of the hydroxyethyl acrylate was changed to 28.2 g in the [d] step. The carboxyl group-containing urethane acrylate oligomer contained 40% by weight of constitution derived from the polytetramethylene ether glycol.

Subsequently, a cured resin composition was obtained by performing in the same manner as in Example 13. The content of the carboxyl group in the curable resin composition was $2.44 \times 10^{-4}$ eq/g. Various physical properties of the composition and the cured resin product are shown in Tables 1 and 2. The product showed properties of high light transmission and surface hardness, low shrinkage at curing and linear expansion coefficient, and excellent degree of surface curing and adhesion. Furthermore, adhesion durability was also good. The cured resin film was substantially insoluble in any solvent of toluene, chloroform, acetone, and tetrahydrofuran when it was attempted to dissolve therein.

Example 15

A carboxyl group-containing urethane acrylate oligomer (150 g) was obtained in the same manner as in Example 13 except that the amount of the isophorone diisocyanate was changed to 50.0 g, the amount of dimethylolbutanoic acid was changed to 4.2 g, the amount of the polytetramethylene ether glycol was changed to 69.7 g, and the amount of the hydroxyethyl acrylate was changed to 26.1 g in the [d] step. The carboxyl group-containing urethane acrylate oligomer contained 47% by weight of constitution derived from the polytetramethylene ether glycol.

Subsequently, a cured resin composition was obtained by performing in the same manner as in Example 13. The content of the carboxyl group in the curable resin composition was $1.41 \times 10^{-4}$ eq/g. Various physical properties of the composition and the cured resin product are shown in Tables 1 and 2.

The product showed properties of high light transmission and surface hardness, low shrinkage at curing and linear expansion coefficient, and excellent degree of surface curing and adhesion. Furthermore, adhesion durability was also good. The cured resin film was substantially insoluble in any solvent of toluene, chloroform, acetone, and tetrahydrofuran when it was attempted to dissolve therein.

Example 16

A cured resin product was obtained in the same manner as in Example 1 except that an electron beam was applied at 2.9 J/cm$^2$ using an electron beam-irradiating apparatus (manufactured by Iwasaki Denki K.K.; Model CB150/15/10L) instead of ultraviolet irradiation by the high-pressure mercury lamp in the [f] step. Various physical properties of the composition and the cured resin product are shown in Tables 1 and 2. The product showed properties of good coating-spreading property, high light transmission and surface hardness, low shrinkage at curing and linear expansion coefficient, and excellent degree of surface curing and adhesion. Furthermore, adhesion durability was also good. The cured resin film was substantially insoluble in any solvent of toluene, chloroform, acetone, and tetrahydrofuran when it was attempted to dissolve therein.

Example 17

A urethane acrylate oligomer (150 g) containing no acid group was obtained in the same manner as in Example 13 except that the amount of the isophorone diisocyanate was changed to 55.2 g, the amount of 1,4-butanediol used instead of dimethylolbutanoic acid was 4.2 g, the amount of the polytetramethylene ether glycol was changed to 61.6 g, and the amount of the hydroxyethyl acrylate was changed to 28.8 g in the [d] step. The urethane acrylate oligomer contained 41% by weight of constitution derived from the polytetramethylene ether glycol. Subsequently, a cured resin composition was obtained by performing in the same manner as in Example 13. The content of the carboxyl group in the curable resin composition was $1.41 \times 10^{-4}$ eq/g. Various physical properties of the composition and the cured resin product are shown in Tables 1 and 2.

The product showed properties of high light transmission and surface hardness, low shrinkage at curing and linear expansion coefficient, and excellent degree of surface curing and adhesion. The cured resin film was substantially insoluble in any solvent of toluene, chloroform, acetone, and tetrahydrofuran when it was attempted to dissolve therein.

Example 18

The following step was performed instead of the [d] step.

In a four-neck flask were placed 14.4 g of 1,4-butanediol, 53.5 g of polytetramethylene ether glycol, 28.2 g of hydroxyethyl acrylate, 0.1 g of methoquinone, and 10 mg of dibutyltin laurate, and the whole was heated at 70 to 80° C. on an oil bath and gently stirred until the temperature became constant. When the temperature reached a constant value, 54.0 g of isophorone diisocyanate was added dropwise through a dropping funnel, followed by 17 hours of stirring while the temperature was maintained at 70 to 85° C. to synthesize 150 g of a hydroxyl group-containing urethane acrylate oligomer. The hydroxyl group-containing urethane acrylate oligomer contained 36% by weight of constitution derived from the polytetramethylene ether glycol.

Subsequently, a cured resin composition was obtained by performing in the same manner as in Example 13. The content of the hydroxyl group in the curable resin composition was $4.05 \times 10^{-4}$ eq/g. Various physical properties of the composition and the cured resin product are shown in Tables 1 and 2.

The product showed properties of high light transmission and surface hardness, low shrinkage at curing and linear expansion coefficient, and excellent degree of surface curing and adhesion. The cured resin film was substantially insoluble in any solvent of toluene, chloroform, acetone, and tetrahydrofuran when it was attempted to dissolve therein.

Comparative Example 1

A transparent curable resin composition was obtained by adding 38.3 g of the above urethane resin composition A and 2.7 g of 1-hydroxycyclohexyl phenyl ketone as a photo radical generator and stirring the mixture at room temperature for 2 hours. Namely, a curable resin composition having no silica particles was obtained.

It was cured and molded in the same manner as in Example 1 to obtain a cured resin product. Various physical properties of the composition and the cured resin product are shown in Tables 1 and 2. The product showed a high light transmission but a low surface hardness, a high linear expansion coefficient and a slightly poor dimensional stability, and a slightly poor adhesion. It is supposed that this is because the product does not contain silica particles. The cured resin product was substantially insoluble in any solvent of toluene, chloroform, acetone, and tetrahydrofuran when it was attempted to dissolve therein.

Comparative Example 2

A resin composition was obtained in the same manner as in Example 1 except that 38.3 g of bis(hydroxymethyl)tricyclo[5.2.1.0$^{2,6}$]decane=diacrylate was used as a resin monomer containing no urethane bond instead of 38.3 g of the urethane resin composition A in the [e] step without performing the [d] step. Various physical properties of the composition and the cured resin product are shown in Tables 1 and 2.

Although light transmission and linear expansion coefficient were low, degree of surface curing was poor and surface hardness was not able to measure. This is because the curing conditions were not appropriate. The cured resin product was substantially insoluble in any solvent of toluene, chloroform, acetone, and tetrahydrofuran when it was attempted to dissolve therein.

Comparative Example 3

The [a] to [d] steps were performed in the same manner as in Example 1 to obtain 50 g of a solution of silane-treated silica particles.

A transparent curable resin composition was obtained by adding 2.7 g of a thermal polymerization initiator t-butyl peroxybenzoate instead of 2.7 g of 1-hydroxycyclohexyl phenyl ketone and stirring the whole at room temperature for 2 hours.

Low-boiling-point components contained in the radiation-curable resin composition were removed by evaporation at 60° C. for 1 hour under reduced pressure.

It was poured into an optical ground glass mold in which walls were formed by combining four silicone sheets having a thickness of 1 mm cut into a width of 1 cm and was placed in an oven set at 100° C. After 2 hours of heating, the product was removed from the glass mold to obtain a cured product. Since the cured resin product was devitrified and lost transparency, it was impossible to measure light transmittance. Various physical properties of the composition and the cured resin product are shown in Tables 1 and 2. The cured resin product was substantially insoluble in any solvent of toluene, chloroform, acetone, and tetrahydrofuran when it was attempted to dissolve therein.

Comparative Example 4

The [a] to [c] steps were performed in the same manner as in Example 1 to obtain 50 g of a solution of silane-treated silica particles.

Then, 38.3 g of pellets of Arton resin (manufactured by JSR Corporation; a thermoplastic resin) was dissolved in 344.7 g of propylene glycol monomethyl ether acetate (PEGMEA) to prepare 383 g of a 10% Arton solution, which was mixed with the above solution of silane-treated silica particles. The mixture was stirred at room temperature for 2 hours to obtain a transparent curable resin composition.

When PEGMEA contained in the curable resin composition was attempted to remove by evaporation at 80° C. under reduced pressure, gelation of the composition proceeded and transparency was completely lost, so that the experiment was stopped.

Comparative Example 5

To 21.3 g of an IPA-ST silica sol solution (manufactured by Nissan Chemical Industries, Ltd.; primary particle size about 12 nm) was added 10 g of acryloxypropyltrimethoxysilane as a silane coupling agent, and the whole was stirred at room temperature for 2 hours to react the surface of silica particles with the silane coupling agent, whereby 31.3 g of a solution of silane-treated silica particles was obtained.

To the above solution of silane-treated silica particles were added 38.3 g of the urethane resin composition A and 2.7 g of 1-hydroxycyclohexyl phenyl ketone as a photo radical generator, and the whole was stirred at room temperature, whereby the mixture became white turbid and devitrified. Even when it was continued to stir, transparency was not restored, so that the experiment was stopped.

Namely, although the amount of the silica particles was small as compared with the case in Example 1, secondary aggregation did occur and the particles were not satisfactorily dispersed.

Comparative Example 6

In Example 6, a curable resin composition containing no silica particles was obtained.

It was cured and molded in the same manner as in Example 6 to obtain a cured resin product. Various physical properties of the composition and the cured resin product are shown in Tables 1 and 2. The product showed a high light transmission but a low surface hardness, a high linear expansion coefficient and a slightly poor dimensional stability, and a slightly poor adhesion. It is supposed that this is because the product does not contain silica particles. The cured resin product was substantially insoluble in any solvent of toluene, chloroform, acetone, and tetrahydrofuran when it was attempted to dissolve therein.

Comparative Example 7

A curable resin composition was obtained in the same manner as in Example 6 except that 8 g of acryloylmorpholine was added in the [e] step. The viscosity of the curable composition was as low as 800 cps. For evaluation of shrinkage at curing, when the curable composition was spin-coated onto a round polycarbonate plate, the thickness of the composition film became very small. Thus, spin-coating conditions were adjusted but unevenness of the film thickness was not able to control and the thickness did not fall within 100±15 μm. Since a sample for correctly evaluate shrinkage at curing was not able to obtain, the evaluation of shrinkage at curing was stopped. Evaluation results other than the item are shown in Tables 1 and 2.

Comparative Example 8

A cured resin product was obtained in the same manner as in Example 6 except that acryloylmorpholine and the additive KF351A were not added in the [e] step. The viscosity of the cured product was as high as 11,000 cps. It showed a poor wetting-spreading property and uneven coating occurred.

Comparative Example 9

A cured resin film was obtained in the same manner as in Example 13 except that the [a], [b], and [c] steps were not performed and 50 g of the solution of silane-treated silica particles was not used in the [e] step. Various physical properties of the curable composition and the cured resin film are shown in Tables 1 and 2. The product showed a high light transmission but a high linear expansion coefficient and a poor dimensional stability, a small surface hardness, and a poor adhesion. It is supposed that this is because the product does not contain silica particles. The cured resin film was substantially insoluble in any solvent of toluene, chloroform, acetone, and tetrahydrofuran when it was attempted to dissolve therein.

Comparative Example 10

A cured resin film was obtained in the same manner as in Example 13 except that 38.3 g of bis(hydroxymethyl)tricyclo[5.2.1.0$^{2,6}$]decane=diacrylate containing no urethane bond was used instead of 38.3 g of a diluted solution in which 50 g of acryloylmorpholine had been added to 150 g of the carboxyl group-containing urethane acrylate oligomer, in the [e] step without performing the [d] step. Various physical properties of the curable composition and the cured resin film are shown in Tables 1 and 2.

The product showed excellent physical properties such as a high light transmission and a low linear expansion coefficient but surface hardness was poor. This is because the curing conditions were not appropriate. The cured resin film was substantially insoluble in any solvent of toluene, chloroform, acetone, and tetrahydrofuran when it was attempted to dissolve therein.

TABLE 1

| | Composition | | | |
| --- | --- | --- | --- | --- |
| | Viscosity (cps) | Surface tension (mN/m) | Remaining solvent | Wetting-spreading property |
| Example 1 | 6500 | 45 | ◯ | X |
| Example 2 | 6900 | 44 | ◯ | X |
| Example 3 | 5900 | 43 | ◯ | X |
| Example 4 | 6500 | 45 | ◯ | X |

TABLE 1-continued

| | Composition | | | |
|---|---|---|---|---|
| | Viscosity (cps) | Surface tension (mN/m) | Remaining solvent | Wetting-spreading property |
| Example 5 | 6500 | 50 | ○ | X |
| Example 6 | 4300 | 35 | ○ | ○ |
| Example 7 | 4600 | 34 | ○ | ○ |
| Example 8 | 2800 | 33 | ○ | ○ |
| Example 9 | 4300 | 35 | ○ | ○ |
| Example 10 | 4200 | 38 | ○ | ○ |
| Example 11 | 3700 | 39 | ○ | ○ |
| Example 12 | 1900 | 37 | ○ | ○ |
| Example 13 | 7800 | 44 | ○ | X |
| Example 14 | 8300 | 44 | ○ | X |
| Example 15 | 9100 | 43 | ○ | X |
| Example 16 | 7800 | 44 | ○ | X |
| Example 17 | 7400 | 50 | ○ | X |
| Example 18 | 6000 | 49 | ○ | X |
| Comparative Example 1 | 3600 | 49 | ○ | X |
| Comparative Example 2 | 4200 | 50 | ○ | X |
| Comparative Example 3 | 6500 | 45 | ○ | X |
| Comparative Example 4 | — | — | ○ | X |
| Comparative Example 5 | — | — | ○ | X |
| Comparative Example 6 | 1500 | 32 | ○ | ○ |
| Comparative Example 7 | 800 | 34 | ○ | ○ |
| Comparative Example 8 | 11000 | 45 | ○ | X |
| Comparative Example 9 | 5500 | 49 | ○ | X |
| Comparative Example 10 | 7100 | 50 | ○ | X |

TABLE 2

| | Cured product | | | | | | | | |
|---|---|---|---|---|---|---|---|---|---|
| | Light transmittance (%) | Surface hardness | Adhesion | Adhesion Durability A (%) | Adhesion Durability B (%) | Shrinkage at curing (mm) | linear expansion coefficient ($\times 10^{-5}/°C$) | Degree of surface curing | Particle size of inorganic component (nm) |
| Example 1 | 86 | F | ◎ | 0 | 0 | 0.3 | 7.9 | ○ | 2-5 |
| Example 2 | 83 | F | ◎ | 0 | 0 | 0.3 | 8.3 | ○ | 2-5 |
| Example 3 | 86 | F | ◎ | 0 | 0 | 0.3 | 7.1 | ○ | 2-5 |
| Example 4 | 88 | H | ◎ | 8 | 10 | 0.2 | 7.1 | ○ | 2-5 |
| Example 5 | 83 | H | ○ | 0 | 0 | 0.6 | 7.1 | ○ | 2-5 |
| Example 6 | 86 | H | ◎ | 0 | 0 | ≦0.1 | 8.0 | ○ | 2-5 |
| Example 7 | 83 | H | ◎ | 0 | 0 | ≦0.1 | 8.1 | ○ | 2-5 |
| Example 8 | 86 | H | ◎ | 0 | 0 | ≦0.1 | 8.0 | ○ | 2-5 |
| Example 9 | 88 | H | ◎ | 0 | 0 | ≦0.1 | 7.2 | ○ | 2-5 |
| Example 10 | 86 | 2H | ◎ | 0 | 0 | ≦0.1 | 8.1 | ○ | 2-5 |
| Example 11 | 86 | H | ○ | 0 | 0 | 0.6 | 7.3 | ○ | 2-5 |
| Example 12 | 86 | H | ○ | 0 | 0 | 0.6 | 7.3 | ○ | 2-5 |
| Example 13 | 85 | 2H | ◎ | 80 | 80 | ≦0.1 | 8.1 | ○ | 2-5 |
| Example 14 | 85 | 2H | ◎ | 88 | 100 | ≦0.1 | 8.6 | ○ | 2-5 |
| Example 15 | 85 | H | ◎ | 100 | 100 | ≦0.1 | 8.7 | ○ | 2-5 |
| Example 16 | 86 | H | ◎ | 84 | 100 | ≦0.1 | 7.8 | ○ | 2-5 |
| Example 17 | 86 | H | ○ | 32 | 0 | ≦0.1 | 8.3 | ○ | 2-5 |
| Example 18 | 85 | H | ○ | 48 | 20 | ≦0.1 | 8.3 | ○ | 2-5 |
| Comparative Example 1 | 89 | 2B | ○ | 0 | 0 | 0.5 | 15.3 | ○ | None |
| Comparative Example 2 | 90 | *1 | ○ | 0 | 0 | 0.6 | 7.3 | Δ | 2-5 |
| Comparative Example 3 | *1 | F | — | — | — | — | — | — | ≧1000 |
| Comparative Example 4 | *1 | — | *1 | — | — | — | *1 | *1 | ≧1000 |
| Comparative Example 5 | *1 | — | — | — | — | — | — | — | ≧1000 |
| Comparative Example 6 | 90 | 3B | ○ | 0 | 0 | 0.3 | 15.0 | ○ | None |
| Comparative Example 7 | 88 | H | ◎ | 0 | 0 | *2 | 8.0 | ○ | 2-5 |
| Comparative Example 8 | 88 | H | ◎ | 0 | 0 | *3 | 8.2 | ○ | 2-5 |
| Comparative Example 9 | 89 | 2B | ◎ | 0 | 0 | 0.3 | 14.9 | ○ | None |
| Comparative Example 10 | 89 | ≦4B | ○ | 0 | 0 | 0.5 | 7.6 | Δ | 2-5 |

*1: impossible to measure
*2: no constant film thickness
*3: occurrence of uneven coating In Examples, cured products showing a high light transmission, a high surface hardness, a low shrinkage at curing, and an excellent degree of surface curing are obtained. Furthermore, when monomers containing a urethane bond and/or oligomers thereof are used as in Examples 1 to 4, 6 to 10, and 13 to 18, adhesion and shrinkage at curing are improved. In addition, when a monomer containing an acid group and/or an oligomer thereof are used as in Example 13 to 16, adhesion durability is improved. Moreover, in Examples 6 to 12, the addition of a surface tension adjuster results in a low surface tension and a good wetting-spreading property.

In the case that no silica particles are present as in Comparative Examples 1, 6, and 9, surface hardness lowers. In the case that the composition is not radiation-curable as in Comparative Examples 3 and 4, transparency decreases. When silica sol instead of silica particles derived from an alkoxysilane is used as in Comparative Example 5, transparency decreases. When the viscosity is out of the defined range as in Comparative Examples 7 and 8, it is difficult to form a coated film. As is understood from Comparative Examples 2 and 10 and Example 5, in the case that an alicyclic acrylate is used, care should be given since degree of surface curing is poor and surface hardness lowers in some cases unless curing conditions are corrected The present invention has been described in detail with reference to specific embodiments, but it is apparent to those skilled in the art that various changes and modifications are possible without departing from the concept and scope of the present invention.

The present application is based on a Japanese Patent Application (JP-2002-325706) filed on Nov. 8, 2002 and a Japanese Patent Application (JP-2003-179251) filed on Jun. 24, 2003, and the contents thereof are hereby incorporated by reference.

INDUSTRIAL APPLICABILITY

As detailed in the above, according to the invention, a radiation-curable resin composition can be provided, which has properties such as transparency and a high adhesion as the conventional protective films for information recording media have and also has a sufficient strength and a low shrinkage at curing even when formed as a thick film.

The invention claimed is:
1. A radiation-curable resin composition, comprising:
   (i) an inorganic component comprising silica particles obtained by hydrolyzing a mixture consisting of an oligomer of an alkoxysilane and a solvent, and
   (ii) a monomer having a radiation-curable functional group, an oligomer having a radiation-curable functional group, or both said monomer and said oligomer,
   wherein the solvent is present in an amount of 5% by weight or less based on the total weight of the radiation-curable resin composition,
   wherein the viscosity of the radiation curable composition at 25° C. is from 1,000 to 10,000 centipoises, and
   wherein the silica particle has a number average particle size of 50 nm or less,
   and wherein a cured product of the composition has a light transmittance of 80% or more at an optical path length of 0.1 mm at 550 nm.
2. The radiation-curable resin composition according to claim 1, wherein surface tension of the composition at 25° C. is 40 mN/m or less.
3. The radiation-curable resin composition according to claim 1, which comprises a silica particle composed of a hydrolyzate of an oligomer of an alkoxysilane as the inorganic component, the silica particle being surface-treated with a compound selected from the group consisting of a silane coupling agent, a hydrolyzate of a silane coupling agent, and a condensate thereof.
4. The radiation-curable resin composition according to claim 1, wherein at least one and the oligomer of the monomer has a group capable of forming an intramolecular hydrogen bond or an intermolecular hydrogen bond.
5. The radiation-curable resin composition according to claim 1, wherein at least one of the monomer and the oligomer contains a urethane bond or a hydroxyalkylene group.
6. The radiation-curable resin composition according to claim 5, wherein at least one of the monomer and the oligomer having a radiation-curable group and containing a urethane bond or a hydroxyalkylene group, has an acid group.
7. The radiation-curable resin composition according to claim 6, wherein the content of the acid group is from $0.1 \times 10^{-4}$ eq/g to $13 \times 10^{-4}$ eq/g.
8. The radiation-curable resin composition according to claim 6, wherein the acid group is a carboxyl group.
9. The radiation-curable resin composition according to claim 5, wherein the radiation-curable group is a (meth)acryloyl group.
10. The radiation-curable resin composition according to claim 1, wherein at least one of the monomer and the oligomer is a compound having no aromatic ring.
11. The radiation-curable resin composition according to claim 1, wherein the composition does not contain any solvent.
12. The radiation-curable resin composition according to claim 1, wherein the silica particle is treated with a silane coupling agent having a radiation-curable group.
13. The radiation-curable resin composition according to claim 12, wherein the silane coupling agent is at least one selected from the group consisting of epoxy cyclohexylethyltrimethoxysilane, glycidoxypropyltrimethoxysilane, vinyltrimethoxysilane, vinyltriethoxysilane, acryloxypropyltrimethoxysilane, methacryloxypropyltrimethoxysilane, mercaptopropyltrimethoxysilane, and mercaptopropyltriethoxysilane.
14. The radiation-curable resin composition according to claim 12, wherein the silica particle treated with the silane coupling agent includes an Si—O—Si bond between the silane coupling agent and the silica particle.
15. The radiation-curable resin composition according to claim 1, wherein the monomer and/or the oligomer has a (meth)acryloyl group and a urethane bond.
16. The radiation-curable resin composition of claim 1, wherein the inorganic component is present in an amount of 5% by weight or more.
17. The radiation-curable resin composition of claim 1, wherein the silica particles have a number average particle size of 40 nm or less.
18. The radiation-curable resin composition of claim 1, wherein the silica particles have a number average particle size of 30 nm or less.
19. The radiation-curable resin composition of claim 1, wherein the silica particles have a number average particle size of 15 nm or less.
20. The radiation-curable resin composition of claim 1, wherein the silica particles have a number average particle size of 12 nm or less.
21. A radiation-cured resin composition obtained by radiation-curing the radiation-curable resin composition according to claim 1.

22. The radiation-cured resin composition according to claim 21, in the form of a film having a thickness of from 20 to 500 µm.

23. The radiation-curable resin composition of claim 1, wherein a radiation cured film of the radiation-curable resin composition having a thickness of 1 mm has a minimum transparency of 83% at 550 nm.

24. The radiation-curable resin composition of claim 1, wherein a radiation cured film of the radiation-curable resin composition having a thickness of 1 mm has a minimum transparency of 85% at 550 nm.

25. The radiation-curable resin composition of claim 1, wherein the solvent is at least one selected from the group consisting of an alcohol, a glycol, a hydrocarbon, an ester, a ketone, and an ether.

26. The radiation-curable resin composition according to claim 1, wherein the solvent is at least one of an alcohol and a ketone.

27. The radiation-curable resin composition according to claim 1, wherein the alcohol is at least one selected from the group consisting of methanol, ethanol, isopropyl alcohol, n-butyl alcohol, isobutyl alcohol, octanol, n-propyl alcohol, and acetylacetone alcohol.

28. The radiation-curable resin composition according to claim 1, wherein the silica particles are obtained by hydrolyzing the oligomer of an alkoxysilane with from 0.3 to 1 equivalents of water based on the mol number of alkoxy groups of the oligomer of an alkoxysilane.

29. A radiation-cured resin film having a thickness of 85 µm or greater obtained by radiation-curing the radiation-curable resin composition according to claim 1.

30. A radiation-cured resin film having a thickness of 100±15 µm obtained by radiation-curing the radiation-curable resin composition according to claim 1.

* * * * *